US012803983B2

(12) United States Patent
Aman-Ul-Haq et al.

(10) Patent No.: US 12,803,983 B2
(45) Date of Patent: Nov. 17, 2026

(54) PER-HOST ACCESS LISTS

(71) Applicant: Arista Networks, Inc., Santa Clara, CA (US)

(72) Inventors: Aman-Ul-Haq, Surrey (CA); Ajay Chhatwal, Fremont, CA (US); John William French, Pacifica, CA (US); Wei Chen, Richmond (CA); John William Flick, San Jose, CA (US)

(73) Assignee: ARISTA NETWORKS, INC., Santa Clara, CA (US)

(*) Notice: Subject to any disclaimer, the term of this patent is extended or adjusted under 35 U.S.C. 154(b) by 294 days.

(21) Appl. No.: 17/859,895

(22) Filed: Jul. 7, 2022

(65) Prior Publication Data

US 2024/0015157 A1 Jan. 11, 2024

(51) Int. Cl.
*H04L 9/40* (2022.01)

(52) U.S. Cl.
CPC ........ *H04L 63/101* (2013.01); *H04L 63/0236* (2013.01); *H04L 63/0876* (2013.01)

(58) Field of Classification Search
CPC ... H04L 63/101; H04L 63/10; H04L 63/0236; H04L 63/0227; H04L 63/02
See application file for complete search history.

(56) References Cited

U.S. PATENT DOCUMENTS 7,367,052 B1 * 4/2008 Desanti .................. H04L 63/06 709/229
7,516,487 B1 * 4/2009 Szeto .................. H04L 63/0263 726/13
9,282,056 B2 * 3/2016 Cors ....................... H04L 47/80
9,571,386 B2 * 2/2017 Zhang ..................... H04L 45/38
9,722,931 B2 * 8/2017 Basso ................. H04L 47/2433
10,104,017 B2 * 10/2018 Berman .................. H04L 49/70
10,205,662 B2 * 2/2019 He .......................... H04L 45/54
10,230,642 B1 * 3/2019 Baveja .................... H04L 47/21
10,546,018 B2 * 1/2020 Lam .................... H04L 45/7452
10,637,778 B1 * 4/2020 Warfield ............... H04L 45/745
10,708,152 B2 * 7/2020 Kulshreshtha ........ H04L 41/145
10,778,612 B2 * 9/2020 Immidi ................. H04L 49/354
10,797,941 B2 * 10/2020 Sharma ............... H04L 43/0876
10,965,596 B2 * 3/2021 Sharma ............... H04L 41/0893
2005/0055573 A1 * 3/2005 Smith ................. G06F 21/6218 726/4
2006/0117058 A1 * 6/2006 Smith ................... H04L 63/105 707/999.102

(Continued)

*Primary Examiner* — Zachary A. Davis
(74) *Attorney, Agent, or Firm* — Sprinkle IP Law Group

(57) ABSTRACT

Methods and network devices for applying access-control lists (ACL) to hosts are disclosed. An ACL to apply to a host is determined and an ACL identifier is associated with this determined ACL. The ACL identifier is associated with a media access control (MAC) address of the host. An ACL entry, including the ACL and the ACL identifier for the ACL, is created in a special purpose memory. When a packet is received from the host, the MAC of the host is determined from the packet and the ACL identifier for the ACL is determined from the association between the ACL identifier and the MAC address. Based on the ACL identifier, a lookup is performed in the special purpose memory to determine the ACL from the ACL entry in the special purpose memory such that the ACL is applied to the packet received from the host.

10 Claims, 17 Drawing Sheets

(56) References Cited

U.S. PATENT DOCUMENTS

| | | | | |
|---|---|---|---|---|
| 2014/0153443 | A1* | 6/2014 | Carter | H04L 45/54<br>370/256 |
| 2021/0392167 | A1* | 12/2021 | Sweeney | H04L 63/0236 |

* cited by examiner 310 (312, 314)

| ACL ID | ACL |
|---|---|
| 0xA | ACL0 |
| 0x9 | ACL1 |
| 0xC | ACL2 |
| ⋮ | ⋮ |

FIG. 3A 300 (302, 304, 306)

| MAC ADDR | PORT ID | ACL ID | |
|---|---|---|---|
| 00:1b:38:24:fc:13 | Fa0/1 | 0xA | 308a |
| 01:16:47:6a:1b:d5 | Fa0/2 | 0x9 | 308b |
| 02:5b:a4:48:c5:9a | Fa0/3 | 0xC | 308c |
| 03:a2:2d:43:3b:62 | Fa0/2 | | 308d |
| 04:4c:e7:a4:23:da | Fa0/3 | | 308e |
| 05:12:34:c8:9a:1b | Fa0/1 | | 308f |
| ⋮ | ⋮ | ⋮ | |

FIG. 3B

PER-HOST ACCESS LISTS

BACKGROUND

Security in computer networks is becoming more critical and complex as networks are increasingly relied upon for communications in a variety of applications and settings. In typical network architectures, devices (hosts) communicating in the network are connected to a network interface of a network device, such as a router or switch, which controls the flow of packets in the network. Thus, access-control lists (ACLs) have been utilized in these network devices to implement security policies, including blocking or filtering unauthorized or potentially harmful network traffic from reaching or accessing particular network destinations. An ACL describes a set of packet match parameters and corresponding actions to take when a packet matches the specific parameters in the ACL's rules. ACLs may be implemented in network devices where security or routing policies are implemented based upon hundreds, if not thousands, of these parameters.

In many cases, these ACLs are applied to incoming packets based on the port of the network device on which such packets are received. These port based ACLs correspond to a particular port of the network device, and are applied to packets arriving on that port. As a result, port based ACLs are applied to (packets from) all hosts on a particular port. In numerous circumstances, however, it is desired that particular ACLs be applied to individual hosts connected to the network device, irrespective of the port to which those hosts are connected.

Moreover, because ACLs are generally implemented for each packet received in a network device, and in order to process and filter network traffic rapidly, ACLs and forwarding operations are typically implemented using a special purpose memory (e.g., a content addressable memory (CAM) or ternary content addressable memory (TCAM)). CAMs and TCAMs are specialized high speed memory components with programmable lookup tables capable of performing parallel lookups of entries in the tables. Because of their limited size and higher cost, use of a TCAM in a network device is limited. Additionally, the programming of a TCAM (e.g., with an ACL or with changes to a previously programmed ACL) usually causes a disruption or leaks in traffic to hosts connected to the network device. Therefore, it may also be desirable to apply particular ACLs to individual hosts connected to a network device in a manner that makes efficient use of the special purpose memory of the network device used to implement ACLs, and to minimize disruption to the hosts connected to that network device when doing so.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIGS. 3A, 3B and 3C are block diagrams depicting example tables stored at a network device in accordance with certain embodiments.

DETAILED DESCRIPTION

Figure 1A:
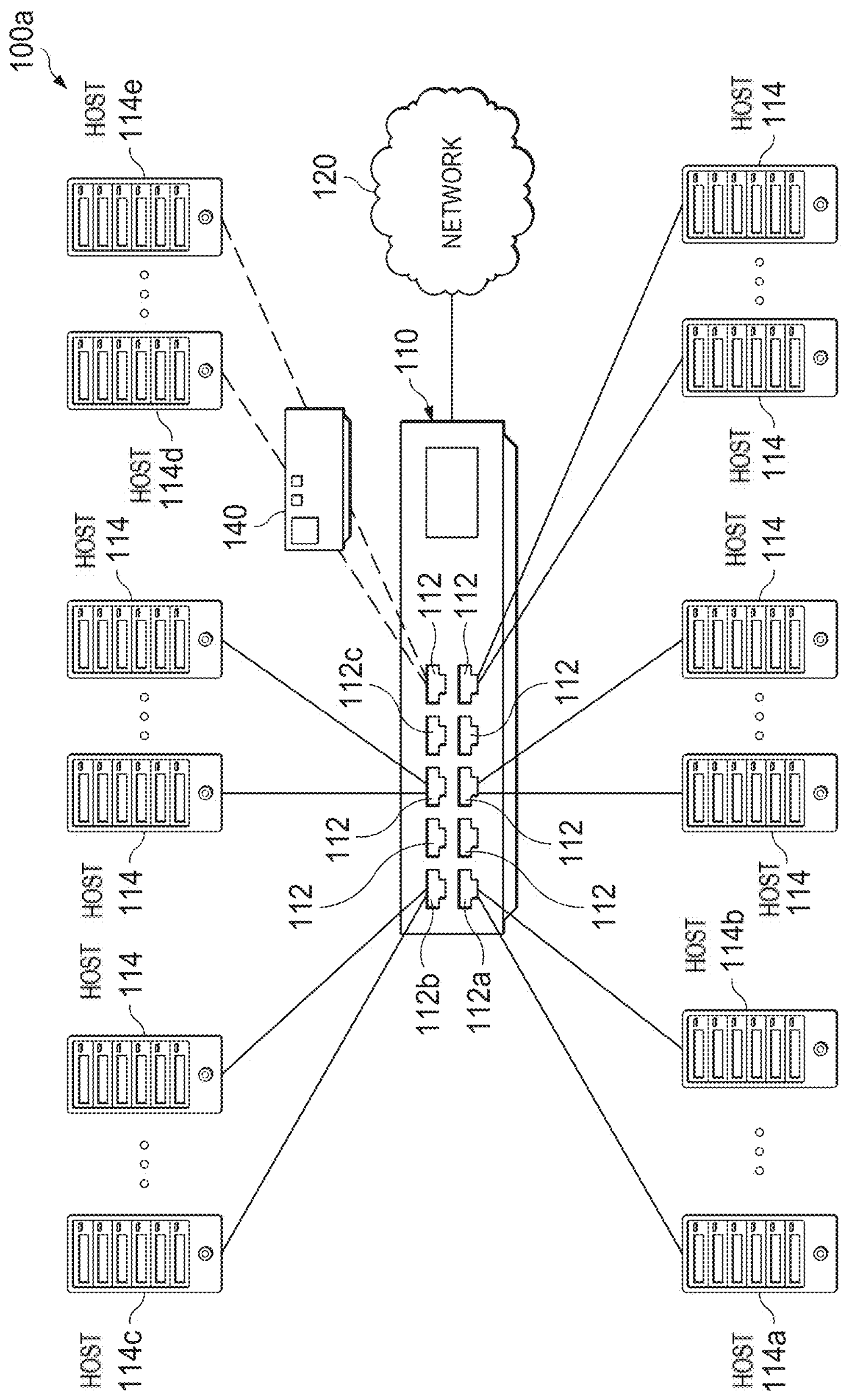
FIGS. 1A and 1B are block diagrams illustrating example network environments including a network device in accordance with certain embodiments.

As discussed, network devices use ACLs to control the flow of packets into and out of the network device. These ACLs are typically implemented by programming them into a special purpose memory, such as a TCAM, Field-Programmable Gate Array (FPGA), or hash table, at the network device. A TCAM is an expensive and limited hardware based memory. For a variety of reasons, it is desired to provide ACLs on a per-host basis in these network devices. In other words, it is desired to implement particular ACLs specifically for particular hosts.

Per-host ACLs, where different ACLs can be applied to individual hosts even when they reside on the same network interface (also referred to as a port), are not typically supported. While port based ACLs are applied to hosts on particular ports, the use of such port based ACLs means that the same ACL is applied to all hosts on the port. These port based ACLs are implemented by programming entries in the TCAM for the ACL to match on the corresponding (ingress) port (in addition to any packet filtering criteria that may be configured in that ACL). Thus, employing traditional solutions (such as port based ACLs) to implement per host ACLs would require programming the TCAM at the network device with ACL entries for each host and its associated ACL. Consequently, entries for the same ACL would need to be replicated such that each copy of that ACL will match on the individual Host IP/MAC to which it applies (again, in addition to any packet filtering criteria that may be configured in that ACL).

Such solutions are inadequate, at least because the TCAM is a limited (e.g., size constrained) resource. Additionally, the programming of a TCAM with an ACL causes disruptions or leaks of traffic for the hosts connected to the network device. Accordingly, the repeated programming or updating of the TCAM with entries for each host requiring a per-host ACL may result in an unacceptable level of disruption to the hosts connected to the device. These disruptions may arise, for example, as a result of the reprogramming, or shuffling, of associated TCAM rules required to place new TCAM entries in a correct or desired priority order relative to previously programmed entries.

To address these issues, among others, embodiments as disclosed herein are capable of applying ACLs on a per-host basis in network devices using indirect referencing between identifiers for the host and identifiers for ACLs programmed into a TCAM or other special purpose memory, allowing hosts sharing the same ACL to be grouped by the identifier for that ACL, and requiring the programming of only a single copy of that ACL in the TCAM associating that ACL identifier with the corresponding ACL (where that ACL may reside in one or more entries of the TCAM). Specifically, when it is determined that an ACL is to be applied to a host at a network device an ACL identifier is associated with that ACL. That ACL identifier is then associated with the media access control (MAC) address of that host in the forwarding database of the network switch. This ACL identifier may, for example, be an ACL Class Identifier which may be stored in the forwarding database. A copy of that ACL (comprising one or more ACL entries), including the ACL and the associated ACL identifier, is programmed into the special purpose memory (e.g., TCAM) at the network device. It will be noted that particular embodiments, examples or implementation as described herein may be described with respect to use of a TCAM as a special purpose memory. It should be understood, however, that in any instance where a TCAM has been described as part of such a particular embodiment, example, or implementation, any other special purpose memory may similarly be utilized.

When a packet is subsequently received from that host at the network device, the MAC of the host is determined from the packet. This MAC address is used to access the forwarding database to determine the ACL identifier from the association between the ACL identifier and the MAC in the forwarding database. Using the determined ACL identifier, a lookup is performed in the special purpose memory (e.g., TCAM) to determine the ACL associated with that ACL identifier from the ACL entry in the special purpose memory. This ACL can then be applied to the received packet from the host.

Embodiments may thus have the advantages of reducing the utilization of the space of the TCAM (or other special purpose memory used to implement ACLs) and providing a commensurate improvement in scalability, as an ACL applying to a set of hosts may occupy only a single copy in the TCAM, regardless of the size of the set of hosts. In other words, use of the TCAM can be optimized as only one copy of the ACL is required to be stored in TCAM while still allowing this ACL to be efficiently applied across a number of hosts.

As an added benefit of embodiments, after the TCAM has been initially programmed with the copy of that ACL and corresponding ACL identifier, the subsequent application of that same ACL to any other hosts is almost immediate, with substantially less disruption to hosts connected to the network device, as there is no need to (again) program the TCAM with that ACL. To elaborate in more detail, when an ACL is to be applied for the first time (for the initial host), a corresponding ACL identifier is assigned to that ACL, and one or more TCAM entries representing that ACL are programmed in the TCAM to match that ACL identifier. Thus, when that ACL is implemented for the initial host, there may be some packet loss for hosts connected to the network device, as the network device cannot allow traffic of that host on the network without the required security authorization (implemented via the ACL) in place (e.g., until that ACL is programmed in the TCAM). However, for subsequent hosts to which that same ACL is applied, the previously assigned ACL identifier and copy of the ACL programmed in the TCAM can be utilized.

In particular, according to embodiments, when it is determined that the (same) ACL is to be applied to another (e.g., subsequent) host at a network device it is determined that the ACL identifier for that ACL is (already) associated with the ACL. That ACL identifier is then associated with the MAC address of that other host in the forwarding database of the network device. Here, as the copy of the ACL (including the one or more ACL entries corresponding to the ACL and the associated ACL identifier) was previously programmed into the TCAM at the network device, there is no need to once again program the TCAM.

The application of that ACL to a packet from this other host functions as described with respect to the initial host. Namely, the MAC of the host is determined from the packet and is used to access the forwarding database to determine the ACL identifier from the association between the ACL identifier and the MAC in the forwarding database. Using the determined ACL identifier, a lookup is performed in the TCAM to determine the ACL associated with that ACL identifier from the ACL entry in the TCAM. This ACL can then be applied to the received packet from the host.

As a result, as the TCAM is not altered when applying that ACL to subsequent hosts, there is no potential traffic leak or drop for any new, or already functioning, hosts. Furthermore, as the inherently slow programming of the TCAM does not have to be undertaken when applying the ACL to subsequent hosts, the authentication response time for these subsequent hosts may be substantially reduced, as the network device does not have to drop or delay traffic in association with the application of the ACL to that host (e.g., as required when applying the ACL to the initial host). These characteristics allow the same ACL to be efficiently applied across a large number of hosts, regardless of whether those hosts are connected to the different ports of the network device. Similarly, then, the transition from a port ACL to the application of a per-host ACL to the host can be almost immediate when such a per-host ACL is applied to that host.

Furthermore, utilizing the TCAM to store such per-host ACL entries (along with the port based ACLs) allows a host to operate under a port based ACL in cases where no per-host ACL has been applied to that host. More particularly, port based ACLs and per-host ACLs can co-exist in the TCAM such that all hosts which have been assigned to an ACL identifier for a per-host ACL will be subject only to that per-host ACL. For hosts where no ACL identifier has been assigned, a port based ACL for the port to which that host is connected can function as a backup security mechanism (e.g., when an ACL has been assigned to that port).

According to certain embodiments, when it is determined that an ACL is to be applied to (e.g., hosts on) a port at a network device, entries for this port based ACL are programmed into the TCAM to match on the identifier of the port to which that ACL is being applied. This programming may entail programming the entries for that port based ACL such that the matching parameter for a port identifier for those entries has the value of the identifier of the port to which the port based ACL is applied and a value for the matching ACL identifier parameter for those entries is a default ACL identifier value (e.g., zero, or another assigned default ACL identifier value). Thus, these entries for a port based ACL in the TCAM may only match a lookup based on the corresponding value for the port identifier as configured for the port identifier parameter of the entry and the default ACL identifier value configured for the ACL identifier parameter of the entry. In contrast, per-host ACL entries in the TCAM for ACLs to be applied on a per-host basis are programmed so the ACL identifier matching parameter of those entries has the value of the ACL identifier assigned to the per-host ACL being programmed. Thus, these per-host ACL entries for an ACL may match a lookup based on the ACL identifier assigned to that per-host ACL.

When a packet is received from a host at a port of a network device, a corresponding port identifier associated with the port to which the host is connected can be determined, along with any ACL identifier for any per-host ACL applied to that host. When an ACL identifier is associated with the host, a lookup is performed in the TCAM based on this associated ACL identifier. An entry in the TCAM associated with the per-host ACL corresponding to that ACL identifier may match such a lookup and be applied to the packet. If no ACL identifier is associated with the host, a lookup is performed in the TCAM based on the determined port identifier and the default ACL identifier value. If a port based ACL has been applied to that port, an entry in the TCAM associated with that port based ACL may match such a lookup, and be applied to the packet.

Embodiments may thus be usefully applied in a diverse variety of settings. One such setting where embodiments may be effectively utilized is in a networked campus environment. A campus network can be thought of as a proprietary local area network (LAN) (or set of interconnected LANs) serving a university, corporation, government agency, or other organization or entity. Often times in these sorts of network environments users desire to join, or access, the campus network, and do so through a network device in the campus network. For example, users in a conference room or classroom may access a campus network through a wired or wireless interface provided by a network device in the network.

In these types of scenarios, campus networks typically have some form of authentication or validation in place. This authentication can be done using authentication, authorization, and accounting (AAA), a widely used standard-based framework for controlling who is permitted to use network resources (through authentication), what they are authorized to do (through authorization), and capture the actions performed while accessing the network (through accounting). In particular, many of these campus networks may authenticate users according to IEEE 802.1X, an authentication protocol to allow access to networks using an authentication server (e.g., a Remote Authentication Dial-In User Service (RADIUS) server).

Hosts (e.g., users at host devices) may thus access the campus network through a network device (e.g., a router or switch) serving as an authenticator. The network device can authenticate the host device using the authentication server based on credentials provided by the host device and allow, block, or otherwise control network traffic between the host and the campus network based on the result of the authentication.

As may be realized, in these types of campus network environments, network administrators may desire to have a fine level of granularity of control over access to the campus network. For example, it may be desired to apply customized authorization levels for individual authenticated hosts. In these situations, then, it is desired to apply ACLs specific to authenticated hosts at the network device. For at least the reasons discussed above, the implementation of ACLs as utilized for traditional port based ACLs cannot easily accommodate such desires, as port based ACLs may only be utilized to apply a single ACL on a particular port (e.g., a port ACL covers all hosts on a particular port, not individual hosts), and replicating ACL entries on a per host basis cannot be effectively scaled because of size constraints on the TCAM of the network device and the desire to minimize disruptions to other hosts.

Accordingly, embodiments of network devices disclosed may allow the application of ACLs identified by an authentication server on a per-host basis using indirect referencing between identifiers for the host and identifiers for ACLs programmed into a TCAM at the network device as discussed. In these embodiments, the network device may serve as an authenticator to authenticate a host device using an authentication server when a host device attempts to access a network. The authentication server can then return (e.g., when the host is authenticated) an ACL name for an ACL (e.g., using the RADIUS filter-id attribute), or a set of ACL filter rules for an ACL (e.g., using the RADIUS NAS-filter-rule attribute).

If the ACL identified (or provided) in the response from the authentication server is not associated with an ACL identifier at the network device (e.g., the ACL determined from the response has not previously been applied to another host connected to the network device), a corresponding ACL identifier is assigned to that ACL at the network device, and one or more TCAM entries representing that ACL are programmed in the TCAM at the network device to match that ACL identifier. That ACL identifier is then associated with the MAC address of the authenticated host in the forwarding database of the network device. This ACL can then be applied to packets received from the host using that host's MAC obtained from those packets to determine the associated ACL identifier, and lookup that ACL in the TCAM based on the ACL identifier.

If, however, it is determined that there is a corresponding ACL identifier associated with the ACL identified in the response from the authentication server (e.g., the ACL determined from the response has been previously applied to another host), that ACL identifier can be associated with the MAC of the authenticated host in the forwarding database of the network device to apply the ACL to packets received from that host (e.g., without (re)programming the TCAM with that ACL, as a copy of that ACL already exists in the TCAM at the network device).

As can be seen, embodiments allow the application of per-host ACLs, and the commensurate advantages that such embodiments entail, in association with authentication in network environments, including preventing the drop or delay of traffic when applying an ACL to multiple hosts, the ability to efficiently apply the same ACL across a large number of hosts, rapid transitions from a port ACL to a per-host ACL and the application of a port based ACL to a host when no per-host ACL has been applied.

Embodiments may also leverage their ability to apply per-host ACLs in an authentication environment to apply these per-host ACLs in a variety of other situations that may occur in these environments. For example, in campus (or other) network environments it may be desired that a lesser, or minimum, level of access still be provided to a host in cases where authentication of that host fails (e.g., the authentication server cannot authenticate the host). Similarly, an authentication server may become completely unresponsive (e.g., because of network maintenance or server failure). In these circumstances a network administrator may want to continue to grant some level of access to the network to hosts (e.g., as opposed to bringing the entire campus network to a halt).

Embodiments may thus allow specific ACLs to be defined for corresponding authentication results in a network environment, and those ACLs applied on a per-host basis. In particular, embodiments may allow an authentication unresponsive ACL to be configured such that this authentication unresponsive ACL may be applied to a host by the network device in instances where the authentication server does not respond to an authentication request for that host from the network device. Likewise, embodiments may allow an authentication failure ACL to be configured so that the authentication failure ACL may be applied to a host by the network device in instances where an authentication failure for that host is received from the authentication server.

This configuration may be accomplished, for example, using an interface (such as a command line interface or the like) provided by the network device such that a network administrator (or other user) may utilize the interface to configure the authentication unresponsive ACL or the authentication failure ACL using this interface. This configuration can comprise providing an ACL name for the authentication unresponsive ACL or the authentication failure ACL, whereby the network device stores this ACL name in association with a corresponding identifier of the authentication result for which that ACL should apply (e.g., authentication failure or authentication unresponsive).

Accordingly, when the authentication result occurs in conjunction with the authentication of a host by the network device (e.g., when the authentication of the host fails or the authentication server is unresponsive), the ACL configured for that authentication result (e.g., the authentication unresponsive ACL or the authentication failure ACL) can be applied to that host. The application of this ACL to the host based on the authentication result for that host may be accomplished as previously described such that only a single copy of that ACL is programmed in the TCAM regardless of the number of hosts to which it is applied, resulting in the same advantages in the application of these default ACLs for these authentication results.

Before describing embodiments in more detail, It may be helpful to an understanding of embodiments to generally discuss the operation of embodiments of such network devices in a network environment. Referring first to FIG. 1A, a network environment 100*a* includes a network device 110 (such as a switch or a router) comprising a plurality of network interfaces 112 to which hosts 114 are connected (e.g., through a wired or wireless connection) to access network 120. These hosts 114 may be directly connected to a network interface 112 or indirectly connected to a network interface 112 through one or more other network devices. For example, hosts 114*d*, 114*e* may be connected to network interface 112*c* indirectly through intermediary network device 140. These intermediary network devices may be, for example, bridging devices such as hubs, switches, Internet Protocol (IP) phones with multiple ports, or other types of network devices.

The network device 110 can apply ACLs to control the flow of packets from hosts 114 into and out of network device 110 and onto the network 120. The network device 110 implements such ACLs by programming them into a special purpose memory, such as a TCAM, at the network device 110. While port based ACLs can be applied to hosts 114 on particular network interfaces 112 by the network device 110, the use of such port based ACLs means that the same ACL is applied to all hosts 114 on the network interface 112. For example, a port based ACL may be applied to network interface 112*a* by network device 110. The application of this port based ACL by the network device 110 causes this ACL to be applied to packets from all hosts 114*a*, 114*b* (and any other hosts) connected to that network interface 112*a* of the network device 110.

Embodiments of network device 110 are thus configured to apply ACLs to hosts 114 connected (directly or indirectly) to the network interfaces 112 of the device on a per-host basis. In this manner, ACLs may be applied to individual hosts 114 regardless of the network interface 112 to which they are connected, and the same (or different) ACLs can be applied to hosts 114 connected to different (or the same) network interfaces 112 of the network device 110. Continuing with the above example, when applying per-host ACLs network device 110 may apply different ACLs to different hosts 114*a*, 114*b* couped to the same network interface 112*a*, or may apply the same per-host ACL to different hosts 114*a*, 114*c* connected to different network interfaces 112*a*, 112*b*. Moreover, such per-host ACLs may be applied by the network device 110 to hosts 114*d*, 114*e* indirectly connected to network interface 112*c* of the device 110.

Figure 1B:
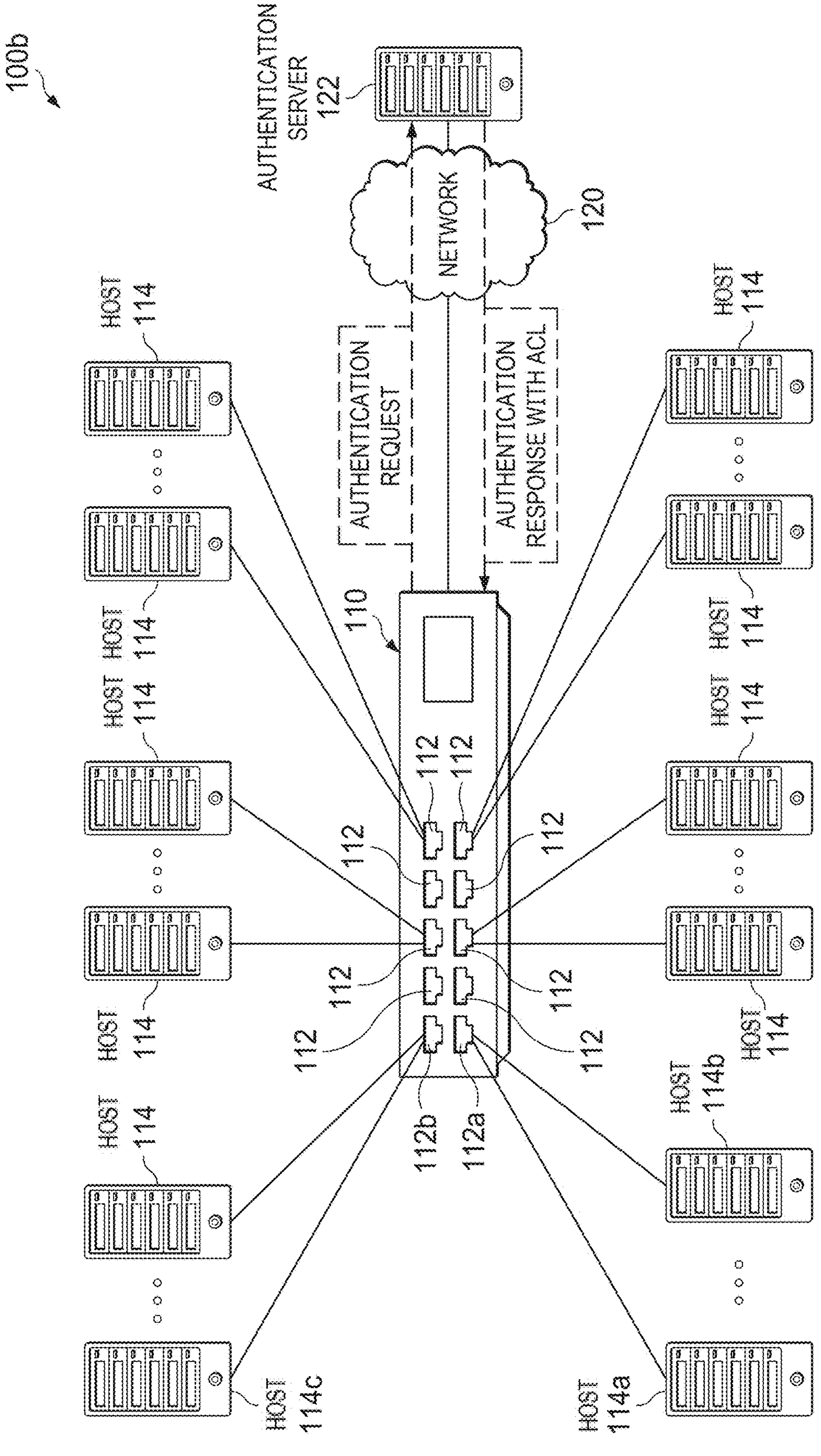

Looking now at FIG. 1B, embodiments of network device 110 can be usefully applied in certain network environments, such as when the network device 110 is utilized as an authenticator in a network environment 100*b*. Here, in order to gain access to network 120, hosts 114 need to be authenticated. Network device 110 serves as an authenticator in network environment 100*b* to authenticate these hosts 114 using authentication server 122 (such as a RADIUS server or the like), and can control network traffic between the hosts 114 and the network 120 based on the result of the authentication. Accordingly, network device 110 sends an authentication request (e.g., an authentication or access request, a challenge request, etc.) to the authentication server 122 when a host 114 is attempting to access the network 120.

The authentication server 122 can then return an authentication response (e.g., an access-accept response), where the authentication response from the authentication server identifies an ACL to apply to the host 114 being authenticated. This ACL can be identified, for example, using an ACL name for the ACL, or a set of ACL filter rules for the ACL. The network device 110 can apply the ACL identified by the authentication server 122 to the individual host 114 being authenticated on a per-host basis, allowing customized access controls specific to individual hosts 114 on the network 120 (e.g., based on the authorization level as determined by the authentication server 122).

In either instance, network device 110 may implement an ACL on a per-host basis using an association between identifiers for each host 114 to which that ACL applies, and an identifier for that ACL assigned to the ACL by the network device 110. The identifier for the host 114 utilized in various embodiments is the MAC address of the host 114 to which the ACL is to be applied. The association between the MAC address of each host 114 to which the ACL applies and the ACL identifier for that ACL can be stored in a forwarding database at the network device 110. A single copy of that ACL is programmed into the TCAM at the network device 110 when that ACL is initially applied to a host 114. As packets arrive at the network device 110 from each of the hosts 114 to which that ACL has been applied, the respective MAC address of that host 114 can be used to determine the ACL identifier for that ACL from the association between the MAC address and the ACL identifier in the forwarding database. A lookup in the TCAM can then be performed using the determined ACL identifier to apply the ACL to that host. In this way, the single copy of the ACL programmed in the TCAM of the network device may be used to apply that ACL on a per-host basis to multiple individual hosts 114 connected to the network device 110.

When a packet is subsequently received from that host at the network device, the MAC of the host is determined from the packet. This MAC address is used to access the forwarding database to determine the ACL identifier from the association between the ACL identifier and the MAC in the forwarding database. Using the determined ACL identifier, a lookup is performed in the TCAM to determine the ACL associated with that ACL identifier from the ACL entry in the special purpose memory. This ACL can then be applied to the received packet from the host.

Figure 2:
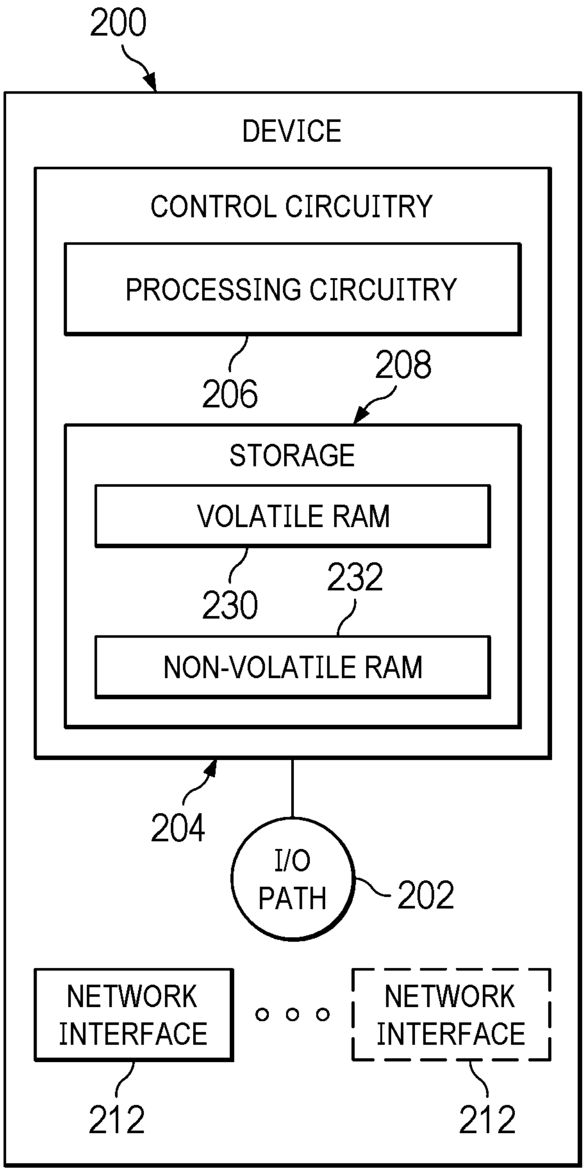
FIG. 2 is a block diagram depicting a general architecture of a network device for applying per-host ACLs in accordance with certain embodiments.

FIG. 2 is a block diagram depicting a general architecture of a network device for applying per-host ACLs in accordance with certain embodiments. Network device 200 may be a router, switch, server, or any other computing device that may be configured to control or process network traffic. The network device 200 may receive data, including packets from hosts (not shown), via an input/output (I/O) path 202. I/O path 202 may provide packets to control circuitry 204, which includes processing circuitry 206 and storage (i.e., memory) 208. Control circuitry 204 may send and receive commands, requests, and other suitable data using I/O path 202. I/O path 202 may connect control circuitry 204 (and specifically processing circuitry 206) to one or more network interfaces 212 to which other devices of a network (e.g., hosts) can be connected. These network interfaces 212 may be any type of network interface, such as an RJ45 ethernet port, a coaxial port, etc.

Control circuitry 204 includes processing circuitry 206 and storage 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units (e.g., two INTEL® CORE™ i7 or i9 processors) or multiple different processors (e.g., an INTEL® CORE™ i5 processor, an INTEL® CORE™ i7 processor, an INTEL® CORE™ i9 processor, etc.). The circuitry described herein may execute instructions included in software running on one or more general purpose or specialized processors.

Storage 208 may be an electronic storage device that includes volatile random-access memory (RAM) 230, which does not retain its contents when power is turned off, and non-volatile RAM 232, which does retain its contents when power is turned off. As referred to herein, the phrase "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same.

According to embodiments, control circuitry 204 executes instructions for implementing ACLs on a per-host basis. For example, the control circuitry 204 may determine ACLs to be applied to hosts connected to the network interfaces 212, determine ACL identifiers for those ACLs, store the determined ACL identifiers in association with the ACL (e.g., in a table in RAM of storage 208), store ACL identifiers in association with MAC addresses for those hosts in a forwarding database (e.g., a table in RAM or a CAM of storage 208), program a copy of those ACLs in association with the ACL identifiers for those ACLs in a special purpose memory of storage 208 (e.g., such as a TCAM, FPGA, or hash table), determine MAC addresses associated with incoming packets, performing lookups in the forwarding database in storage 208 based on determined MAC addresses to determine any ACL identifiers associated with the MAC addresses, and perform lookups in the special purpose memory of storage 208 based on any determined ACL identifier to apply the corresponding ACL in the special purpose memory associated with the ACL identifier.

Figure 3C:
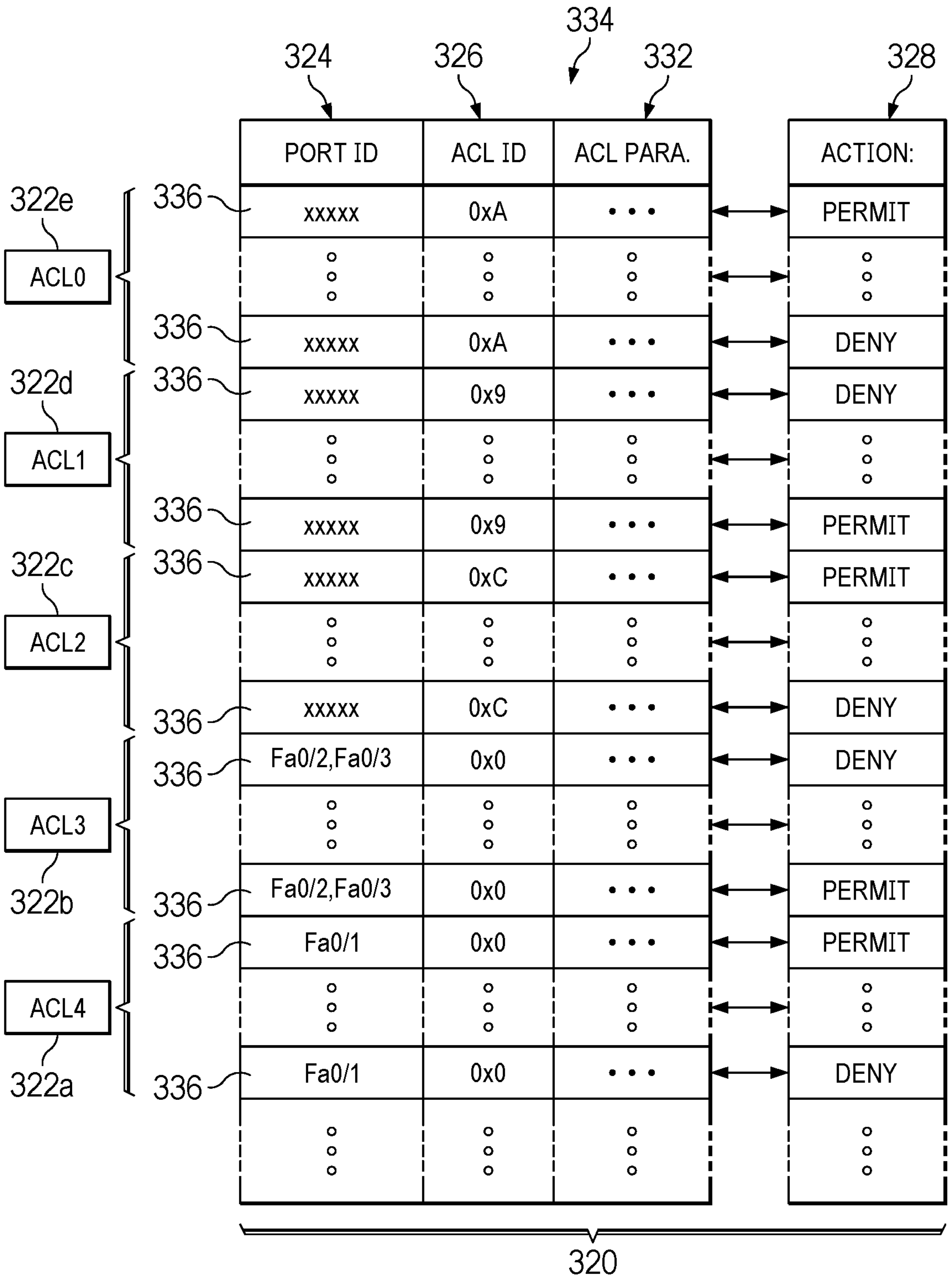

Examples of tables that are stored at a network device in accordance with certain embodiments are depicted in FIGS. 3A, 3B and 3C. FIG. 3A is an example ACL identifier table for ACL identifiers assigned to corresponding ACLs. FIG. 3B is an example forwarding database (forwarding table) for associating MAC addresses of hosts with their corresponding network interface (port) and corresponding ACL identifier for any ACL assigned to the host. FIG. 3C is an ACL lookup table including entries for programmed ACLs.

Starting first with FIG. 3A, entries in ACL identifier table 310 include an ACL identifier 312 and a corresponding ACL 314. ACL identifiers 312 can be assigned to an ACL by a network device, such as when that ACL is to be initially applied (e.g., to a host). These ACL identifiers 312 may, for example, be an ACL Class Identifier selected from a block of class identifiers that may be assigned by a network device to incoming packets. Accordingly, ACL identifier table 310 may be programmed with entries associating an ACL 314 with a corresponding assigned ACL identifier 312, and likewise may be accessed based on an ACL 314 to determine if an ACL identifier 312 has been assigned to that ACL 314. This ACL identifier table 310 may be a standalone table or part of a larger table and may be stored in RAM, a dedicated memory (e.g., a CAM) or another type of memory.

Moving to FIG. 3B, entries 308 in forwarding database 300 include MAC addresses 302, port identifiers 304, and ACL identifiers 306. A MAC address 302 for a host and a port identifier 304 for a network interface to which that host is connected can be determined (e.g., from a received packet). The MAC address 302 of that host and the port identifier 304 can be associated in an entry 308 in forwarding database 300. Similarly, when it is determined that an ACL is to be applied to a host on a per-host basis, the ACL identifier 306 associated with that ACL can be stored in the forwarding database 300 in the entry 308 of the forwarding table 300 corresponding to the MAC address 302 for that host. Entries 308*a*, 308*b* and 308*c* in forwarding database 300 are examples of entries 308 where a per-host ACL has been applied to the host associated with the MAC address 302, while entries 308*d*, 308*e* and 308*f* are examples of entries 308 where no per-host ACL has been applied to the host corresponding to the MAC address 302 of those entries 308. Thus, when a lookup is performed on forwarding database 300, a match for a MAC address 302 results in the corresponding port identifier 304 associated with that MAC address 302 in the entry 308 for that MAC address 302, along with any ACL identifier 306 associated with that MAC address 302 in the entry 308 (e.g., in cases where an ACL has been applied to that host and the ACL identifier 306 for that ACL associated with the corresponding entry in forwarding database 300). This forwarding database 300 may be a standalone table or part of a larger table, and may be stored in RAM, a dedicated memory (e.g., a CAM) or another type of memory.

Going now to FIG. 3C, ACL table 320 is a lookup table for ACLs that may be stored in a special purpose memory of a network device, such as a TCAM or a hash table. For ease of discussion, certain embodiments are presented and discussed herein with respect to the use of a TCAM to implement an ACL table 320 without loss of generality. It should be noted, however, that these descriptions of embodiments in association with a TCAM may apply equally well to the use of other types of special purpose memory for implementation of such ACL tables, and that use of such other types of special purpose memory for an ACL table is fully contemplated.

ACL table 320 may include one or more entries 336 for each ACL 322 programmed into the ACL table 320, where each entry 336 includes a set of matching parameters 334 and a corresponding action 328. These actions 328 may include permit or deny actions (e.g., allowing or dropping a packet) or other actions, such as counting or logging the packet, etc. The set of matching parameters 334 for an ACL entry 336 include a port identifier 324 and an ACL identifier 326. Each entry for an ACL in the ACL table 320 may also include additional matching parameters 332 for that ACL entry 336, such as network address or protocol parameters, or other types of parameters (e.g., that may be obtained from a packet or as a result of analysis of a packet).

ACL table 320 is thus configured to perform a lookup based on values for the set of parameters 324, 326, 332 to find any matching ACL entry 336 of the ACL table 320 such that the action 328 of that matching entry 336 can be applied. Accordingly, when it is determined that an ACL 322 is to be applied to a port at a network device, entries 336 for this port based ACL (port ACL entries) are programmed into the ACL table 320 to match on the identifier of the port to which that ACL is being applied. Specifically, the entries 336 for that port based ACL are programmed such that the matching parameter for the port identifier 324 for those entries 336 has the value of the identifier of the port to which the port based ACL is applied. Additionally, according to embodiments, the programmed value for the matching ACL identifier parameter 326 for these entries 336 for port based ACLs is a default ACL identifier value (e.g., zero, or another assigned default ACL identifier value). Thus, these entries 336 for a port based ACL in ACL table 320 may only match a lookup based on the corresponding value for the port identifier as configured for the port identifier parameter 324 of the entry 336 and the default ACL identifier value configured for the ACL identifier parameter 332 of the entry 336. Examples of these types of port ACL entries 336 are illustrated with respect to port based ACLs 322*a*, 322*b*.

When it is determined that an ACL 322 is to be applied on a per-host basis (e.g., is to be initially applied to a host), entries 336 for this per-host ACL (per-host ACL entries) are programmed into the ACL table 320 to match on the ACL identifier assigned to that ACL (e.g., as stored in ACL identifier table 310). Here, entries 336 for that per-host ACL are programmed in ACL table 320 so the ACL identifier matching parameter 326 has the value of the assigned ACL identifier of the per-host ACL being programmed. As is known, TCAM has the ability to store and query data using three different inputs: 0, 1 and X (don't care). According to certain embodiments, therefore, the value for the matching port identifier parameter 324 for these per-host ACL entries 336 are programmed as "don't care" in ACL table 320. Thus, these entries 336 for a per-host ACL in ACL table 320 may only match a lookup based on the corresponding value for the ACL identifier configured for the ACL identifier parameter 326 for those entries 336, and may do so regardless of any value for a port identifier parameter 324 included in such lookups. Examples of these types of entries 336 are illustrated with respect to per-host based ACLs 322*c*, 322*d* and 322*e*.

ACL table 320 can be used in association with ACL identifier table 310 and forwarding database 300 to efficiently implement per-host ACLs, and to implement such per-host ACLs in a manner whereby port based ACLs may be utilized as a backup security measure. To illustrate, port based ACLs are applied to (e.g., hosts on) particular ports by programming entries 336 for those port based ACLs in ACL table 320 to match based on an identifier for the port to which that ACL applies, and a default ACL identifier (e.g., in addition to any packet matching criteria that may be configured for those ACL entries). Per-host ACLs applied to individual hosts are assigned an ACL identifier 312, and the association between these per-host ACLs 314 and corresponding ACL identifiers 312 are stored in ACL identifier table 310. Additionally, the ACL identifier 306 for the per-host ACL applied to a host is associated with the MAC address 302 of that host in the entry 308 for that host in forwarding database 300. Thus, each host to which the per-host ACL is applied has the corresponding ACL identifier 306 for that host associated with its corresponding MAC address 302 in the entry 308 of forwarding database 300 corresponding to that host. Entries 336 for a per-host ACL are programmed into ACL table 320 to match based on the ACL identifier 326 associated with that ACL (e.g., in addition to any packet matching criteria that may be configured for those ACL entries) without regard to a port identifier (e.g., the port identifier is a "don't care" for these entries).

When a packet is received from a host at a port of a network device, the MAC address of that host is determined from the packet. A lookup can then be performed in forwarding database 300 based on the determined MAC address. A match for that MAC address 302 in forwarding database 300 results in the corresponding port identifier 304 associated with that MAC address 302 in that entry 308, along with any ACL identifier 306 associated with that MAC address 302 (e.g., in cases where a per-host ACL has been applied to that host). When the lookup in the forwarding database 300 based on the MAC address results in both an ACL identifier and a port identifier, a lookup is then performed in the ACL table 320 based on the ACL identifier (e.g., in addition to any other packet matching criteria). An entry 336 in the ACL table 320 associated with the per-host ACL corresponding to that ACL identifier may match such a lookup, and be applied to the packet. Alternatively, when the lookup in the forwarding database 300 based on the MAC address results in a port identifier (e.g., no ACL identifier is associated with that MAC in forwarding database 300) a lookup is performed in the ACL table 320 based on that port identifier and the default ACL identifier value (e.g., in addition to any other packet matching criteria). If a port based ACL for the identified port has been programmed in ACL table 320, an entry 336 in the ACL table 320 associated with that port based ACL may match such a lookup, and be applied to the packet.

By utilizing ACL table 320 to store such per-host ACL entries 336 (along with the entries 336 for port based ACLs) a port based ACL can still be applied to that host in cases where no per-host ACL has been applied to that host. Specifically, as port based ACL and per-host ACLs co-exist in the ACL table 320, all hosts which have been associated with an ACL identifier for a per-host ACL (e.g., in forwarding database 300) will be subject only to that per-host ACL. For hosts not associated with an ACL identifier (e.g., in forwarding database 300), a port based ACL for the port to which that host is connected can be utilized as a backup security mechanism (e.g., when an ACL has been assigned to that port).

Additionally, embodiments may reduce the utilization of the space of the TCAM (e.g., used for ACL table 320) and improve scalability, as applying a per-host ACL to multiple hosts may necessitate only that a single copy of that ACL be programmed in ACL table 320, regardless of the number of hosts to which that per-host ACL is applied. Consequently, a TCAM used for an ACL table 320 can be optimized, as only one copy of the ACL is required to be stored in the TCAM while still allowing this ACL to be efficiently applied across each of those hosts. Moreover, after the ACL table 320 is programmed for a per-host ACL, the subsequent application of that same ACL to any other hosts is almost immediate, with substantially less disruption to hosts coupled to the network device, as there is no need to (re) program the ACL table 320 for that ACL.

Figure 4A:
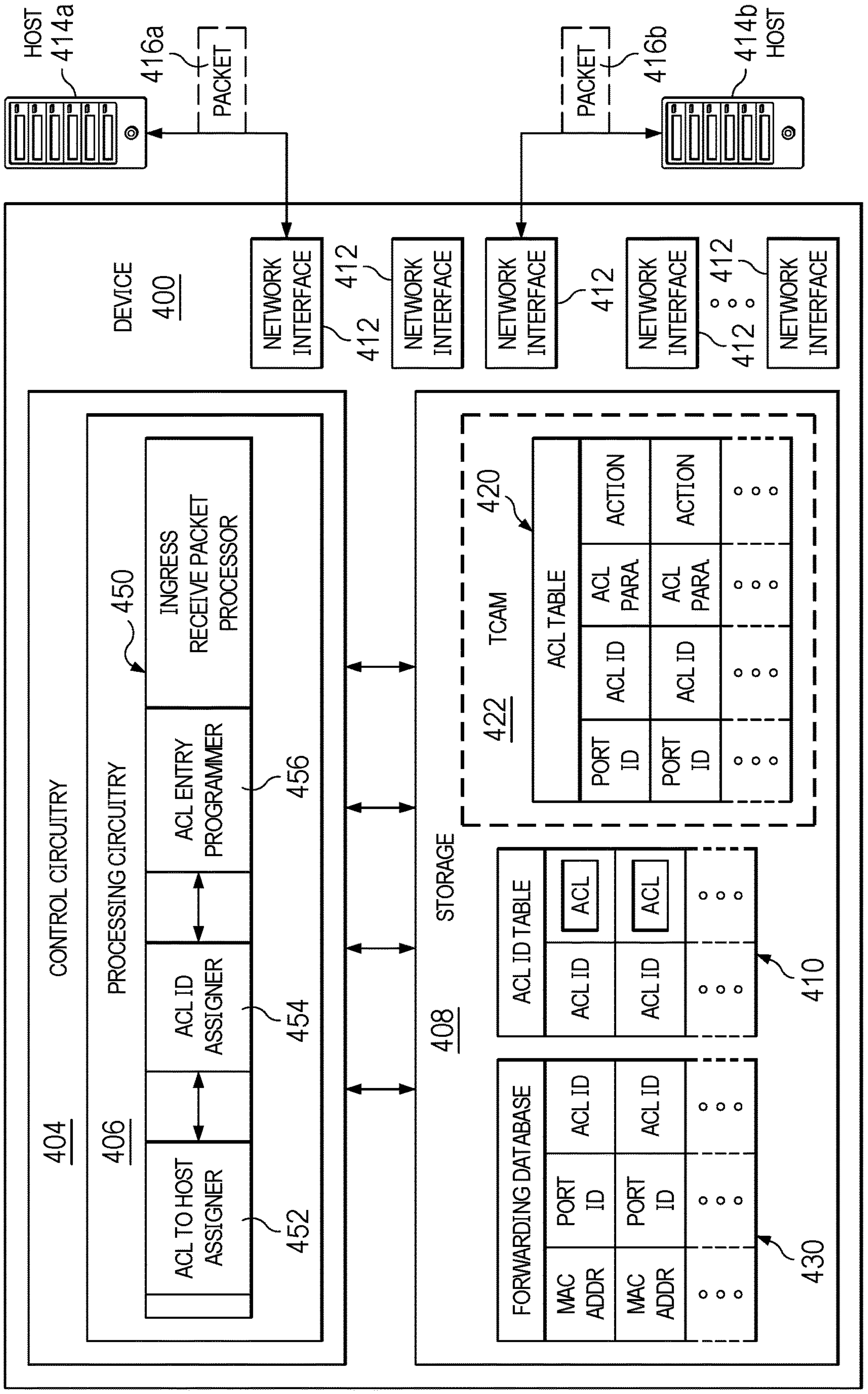
FIG. 4A is a block diagram of an embodiment of a network device for applying per-host ACLs.

FIG. 4A is a more detailed depiction of an embodiment of a network device for applying per-host ACLs. In this embodiment, network device 400 includes ingress receive packet processor 450 for applying per-host (or other) ACLs to packets 416 received from hosts 414 coupled to network interfaces 412 of the device 400. Ingress receive packet processor 450 may be implemented in hardware, software, or any suitable combination of hardware and software (e.g., in control circuitry 404). For example, ingress receive packet processor 450 may be a software program stored on storage 408 (e.g., non-volatile RAM) and executed by processing circuitry 406. A forwarding database 430, ACL ID table 410 and ACL table 420 may also be stored in storage 408. Specifically, forwarding database 430, ACL ID table 410 and ACL table 420 may be configured as described above with respect to FIGS. 3A, 3B and 3C. Forwarding database 430 and ACL ID table 410 can be stored in RAM, or a dedicated memory (e.g., a CAM) of storage 408, while ACL table 420 is a lookup table in TCAM 422 of storage 408.

Ingress receive packet processor 450 includes, in turn, an ACL to host assigner 452, an ACL ID assigner 454 and an ACL entry programmer 456. ACL to host assigner 452 is configured to determine if ACLs are to be applied to a host 414, what ACLs are to be applied to a host, and to create or update (used herein interchangeably) entries in forwarding database 430 to associate a MAC address of a host 414 with an ACL identifier. ACL ID assigner 454 is configured to determine an ACL identifier to assign to a (per-host) ACL, create an entry in ACL ID table 410 associating the assigned ACL identifier with the corresponding ACL, and determine if an ACL identifier has been associated with a given ACL (e.g., using ACL ID table 410). ACL entry programmer 456 is configured to program entries for an ACL in ACL table 420.

Accordingly, ACL to host assigner 452 can determine that an ACL is to be applied to a host 414*a* on a per-host basis. This determination can be made in response to receiving a packet 416*a* from that host 414*a*, such as when an authentication is performed, or in some other manner. For example, a per-host ACL may be manually configured through an interface provided by device 400, or automatically configured through a communication from another device or application. When ACL to host assigner 452 determines a per-host ACL is to be applied to a host 414*a*, the ACL to host assigner 452 may communicate with ACL ID assigner 454 to determine an ACL identifier associated with that ACL.

ACL ID assigner 454 accesses ACL ID table 410 to make such a determination. If an ACL identifier has been assigned to that ACL (e.g., ACL ID assigner 454 accesses ACL ID table 410 and determines there is an ACL identifier associated with the ACL), the ACL identifier of the ACL determined from ACL table 410 can be returned to ACL to host assigner 452. If, however, no ACL identifier has (e.g., previously) been assigned to that ACL (as determined from ACL ID table 410), the ACL ID assigner 454 can assign an ACL identifier to the ACL and return the assigned ACL identifier to the ACL to host assigner 452. The ACL identifier assigned by the ACL ID assigner 454 can be, for example, an ACL Class Identifier selected from a block of class identifiers that may be assigned by network device 400 to incoming packets 416. When no ACL identifier has been assigned to that ACL, the ACL ID assigner 454 also communicates with ACL entry programmer 456 to program a copy of that per-host ACL (comprising one or more ACL entries) into ACL table 420. ACL entry programmer 456 programs the entries for this ACL in ACL table 420 to match a lookup based on the assigned ACL identifier for that ACL. These entries for the per-host ACL are also programmed in the ACL table 420 as “don’t care” for a port identifier parameter.

In both the case where an ACL identifier was assigned to the ACL and the ACL programmed in the ACL table 420, and the case where an ACL identifier was previously associated with the ACL, the ACL to host assigner 452 receives the ACL identifier assigned to the per-host ACL to be applied to the host 414*a*. The ACL to host assigner 452 associates that ACL identifier with the MAC of that host 414*a* in an entry for that host 414*a* in forwarding database 430.

When a packet 416*a* is subsequently received from that host 414*a* at the network device 400, the MAC of the host 414*a* can be determined from the packet 416*a* by ingress receive packet processor 450. This MAC address is used by ingress receive packet processor 450 to access the forwarding database 430 to determine the ACL identifier associated with the MAC address of the host 414*a* from the association between the MAC address and the ACL identifier in the forwarding database 430. Ingress receive packet processor 450 performs a lookup in the ACL table 420 based on that ACL identifier to determine any entry of that ACL to apply to the packet 416*a* received from the host 414*a*.

Thus, after the ACL table 420 in TCAM 422 has been initially programmed with the copy of that ACL and the corresponding ACL identifier associated with the ACL in ACL ID table 410, the subsequent application of that same ACL to any other hosts 414 is almost immediate, with substantially less disruption to hosts connected to the network device, as there is no need to (again) program the ACL table 420 or the ACL ID table 410.

Suppose for example, that the ACL was initially applied to host 414*a* and it is then subsequently determined by ACL to host assigner 452 that this ACL is to be applied to another host 414*b* (e.g., connected to the same, or a different, network interface 412). Here, the ACL to host assigner 452 may communicate with ACL ID assigner 454 to determine an ACL identifier is associated with that ACL. ACL ID assigner 454 accesses ACL ID table 410, determines the ACL identifier previously assigned to that ACL stored in ACL ID table 410, and returns the ACL identifier to host assigner 452. The ACL to host assigner 452 receives the ACL identifier assigned to the ACL to be applied to the host 414*b*, and associates that returned ACL identifier with the MAC of that host 414*b* in an entry for that host 414*b* in forwarding database 430. Now, as the copy of that ACL (including the one or more ACL entries corresponding to the ACL and the associated ACL identifier) was previously programmed into the ACL table 420 in TCAM 422 at the network device 400, there is no need to (re)program the ACL in the ACL table 420, and that ACL may be immediately applied to packet 416*b* from host 414*b*.

Moreover, utilizing the ACL table 420 in TCAM 422 to store such per-host ACL entries along with port based ACLs allows a host 414 to operate under a port based ACL in cases where no per-host ACL has been applied to that host 414. These port based ACLs and per-host ACLs can co-exist in the ACL table 420 such that all hosts 414 which have been assigned to an ACL identifier for a per-host ACL will be subject only to that per-host ACL. For hosts 414 where no ACL identifier has been assigned, a port based ACL for the network interface 412 (port) to which that host 414 is connected can function as a backup security mechanism (e.g., when an ACL has been assigned to that port).

In some embodiments, ACL entry programmer 456 is configured to program such port based ACLs for a port into ACL table 420. ACL entry programmer 456 programs the entries for a port based ACL in ACL table 420 such that the matching parameter for the port identifier for those entries has the value of the identifier of the port to which the port based ACL is applied, and the ACL identifier parameter for these entries for the port based ACLs is a default ACL identifier value (e.g., zero, or another assigned default ACL identifier value).

Accordingly, when a packet 416 is received from a host 414, ingress receive packet processor 450 determines the MAC of the host 414 from the packet 416. This MAC address is used by ingress receive packet processor 450 to access the forwarding database 430 to determine the port identifier of the port to which the host 414 is connected, and any ACL identifier associated with the MAC address of the host 414, from the entry corresponding to the MAC address in the forwarding database 430. If there is an ACL identifier associated with the MAC address of that host 414 in forwarding database 430, ingress receive packet processor 450 performs a lookup in the ACL table 420 based on that ACL identifier to determine any entry of that ACL to apply to the packet 416 received from the host 414. If, however, there is no ACL identifier associated with the MAC address of the host in forwarding database 430, the ingress receive packet processor 450 performs a lookup in the ACL table 420 based on the identifier of the port to which the host 414 is connected and the default ACL identifier value (e.g., zero) to determine if any entry of any port based ACL should be applied to the packet 416.

Figure 4B:
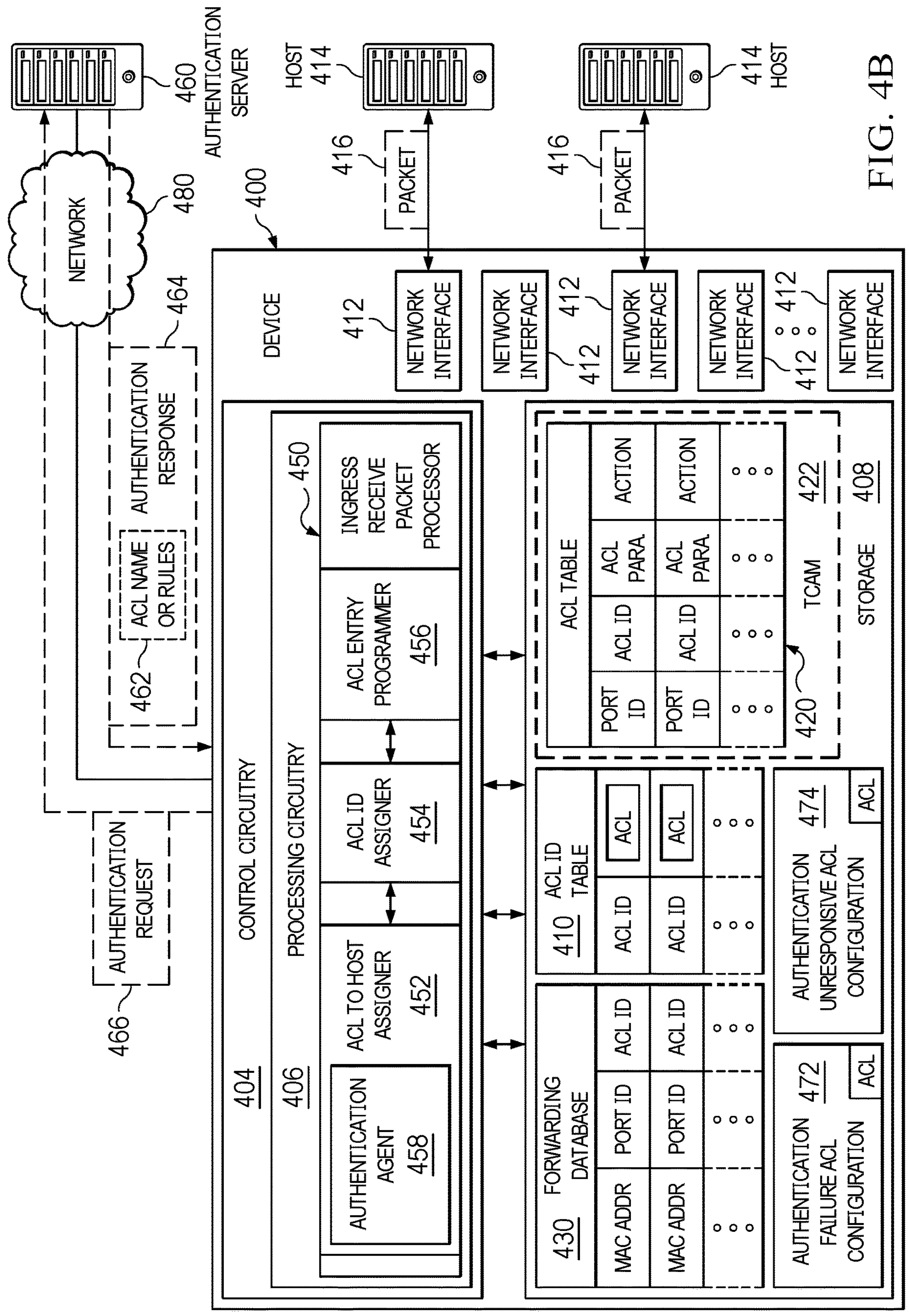
FIG. 4B is a block diagram of an embodiment of a network device for applying per-host ACLs when serving as an authenticator in a networked environment.

As previously mentioned, embodiments of such network devices can be usefully applied in a diverse variety of settings, including when serving as an authenticator in a network environment. FIG. 4B is a depiction of one such embodiment of a network device for applying per-host ACLs when serving as an authenticator in a networked environment. In the depicted embodiment, components labeled with the same reference numerals as in the embodiment depicted in FIG. 4A are configured as described with respect to that embodiment and will not be elaborated on again for ease of description.

In the embodiment of FIG. 4B, device 400 serves as an authenticator in a networked environment. More particularly, ACL to host assigner 452 may be included in authentication agent 458 configured to authenticate hosts 414 using authentication server 460 based on credentials provided by hosts 414 such that network device 400 can allow, block, or otherwise control network traffic between the hosts 414 and network 480 based on the result of the authentication. Authentication server 460 may be a RADIUS server or the like configured to receive authentication requests 466 from network device 400 and return authentication responses 464.

Network device 400 applies ACLs identified by authentication server 460 during authentication of hosts 414 on a per-host basis. During an authentication of a host 414 by network device 400, authentication agent 458 sends an authentication request 466 (e.g., an authentication or access request, a challenge request, etc.) to the authentication server 460. The authentication server 460 can then return an authentication response 464 (e.g., an access-accept response), where the authentication response 464 from the authentication server identifies an ACL 462 to apply to the host 414 being authenticated. This ACL can be identified, for example, using an ACL name for the ACL, or a set of ACL filter rules for the ACL.

Once authentication agent 458 receives the authentication response 464 and the identified ACL 462 for the host 414, ACL to host assigner 452 communicates with ACL ID assigner 454 to determine an ACL identifier associated with that ACL. ACL ID assigner 454 either determines there is an ACL identifier associated with that ACL from ACL ID table 410 and returns the ACL identifier to ACL to host assigner 452, or assigns an ACL identifier to the ACL, returns the assigned ACL identifier to host assigner 452, and communicates with ACL entry programmer 456 to program a copy of that ACL into ACL table 420. The ACL to host assigner 452 associates the ACL identifier from ACL ID assigner 454 with the MAC of the authenticated host 414 in an entry for that host 414 in forwarding database 430. In this manner, ACLs 462 identified by authentication server 460 during authentication of hosts 414 connected to the network device 400 may be applied on a per-host basis to those hosts 414 during an authentication process.

Embodiments of network device 400 may leverage this ability to apply per-host ACLs in an authentication environment to apply these per-host ACLs for other results (e.g., other than a host 414 being successfully authenticated) occurring in the authentication environment. For example, network device 400 may be configured to apply an ACL to a host 414 when the authentication of the host 414 using authentication server 460 fails (e.g., authentication response 464 indicates the host 414 cannot be authenticated), or authentication server 460 is unresponsive to authentication request 466 for the host 414.

In some embodiments, an authentication unresponsive ACL configuration 474 may be stored in storage 408 of network device, where this authentication unresponsive ACL configuration 474 specifies an authentication unresponsive ACL to apply to a host 414 when authentication server 460 does not respond to authentication request 466 for that host 414. Similarly, authentication failure ACL configuration 472 may be stored in storage 408 of network device 400, where this authentication failure ACL configuration 472 specifies an authentication failure ACL to apply to a host 414 when authentication server 460 fails to authenticate that host 414.

This configuration may be accomplished, for example, using an interface (such as a command line interface or the like) provided by the network device 400 such that a network administrator (or other user) may utilize the interface to configure the authentication unresponsive ACL or the authentication failure ACL using this interface. This configuration can comprise providing an ACL name for the authentication unresponsive ACL or the authentication failure ACL, whereby the network device stores this ACL name in the authentication unresponsive ACL configuration 474 or the authentication failure ACL configuration 472.

In this way, when an authentication result occurs in conjunction with the authentication of a host 414 by the network device 400 (e.g., when the authentication of the host fails or the authentication server 460 is unresponsive), the ACL configured for that authentication result (e.g., in the authentication failure ACL configuration 472 or the authentication unresponsive ACL configuration 474) can be applied to packets 416 from that host 414. The application of this ACL to the host 414 based on the authentication result for that host 414 may be accomplished as previously described such that only a single copy of that ACL may be programmed in the ACL table 420 regardless of the number of hosts 414 to which it is applied, resulting in the same advantages in the application of these default ACLs for these authentication results.

As it may be useful here to illustrate some examples of the application of per-host ACLs in an embodiment of network device 400, attention is directed to FIGS. 5A-5G depicting such examples, with components of network device 400 eliminated for ease of depiction. For these examples, assume that network device 400 has been configured with three per-host ACLs, "ACL0" 482*e*, "ACL1" 482*d* and "ACL2" 482*c* that have been assigned, respectively, the ACL identifiers 0xA, 0x9 and 0xC. "ACL0" 482*e* has been applied to a host on port Fa0/1 having MAC address 00:1b:38:24:fc:13, "ACL1" 482*d* has been applied to a host on port Fa0/2 having MAC address 01:16:47:6a:1b:d5, and ACL2" 482*c* has been applied to a host on port Fa0/3 having MAC address 02:5b:a4:48:c5:9a. Thus, entries associating these MAC addresses with the ACL identifiers for these ACLs are included in forwarding database 430. Forwarding database 430 also included entries for hosts having MAC addresses 03:a2:2d:43:3b:62, 04:4c:e7:a4:23:da, and 05:12:34:c8:9a:1b on respective ports Fa0/2, Fa0/3 and Fa0/1, where no per-host ACLs have been applied to these hosts.

Entries for per-host ACLs "ACL0" 482*e*, "ACL1" 482*d* and "ACL2" 482*c* are programmed into ACL table 420 to match a lookup based on the respective assigned ACL identifier for those ACLs (0)<A, 0x9 and 0xC) and as "don't care" for a port identifier parameter. ACL table 420 also includes entries for port based ACL "ACL3" 482*b* applying to ports Fa0/2 and Fa0/3 and port based "ACL4" 482*a* applying to port Fa0/1, where the entries for these port based ACLs in ACL table 420 are programmed to match the identifier of the port to which the respective port based ACLs are applied, and the ACL identifier parameter for these entries for the port based ACLs is the default ACL identifier value (in this example, zero or 0x0).

Figure 5A:
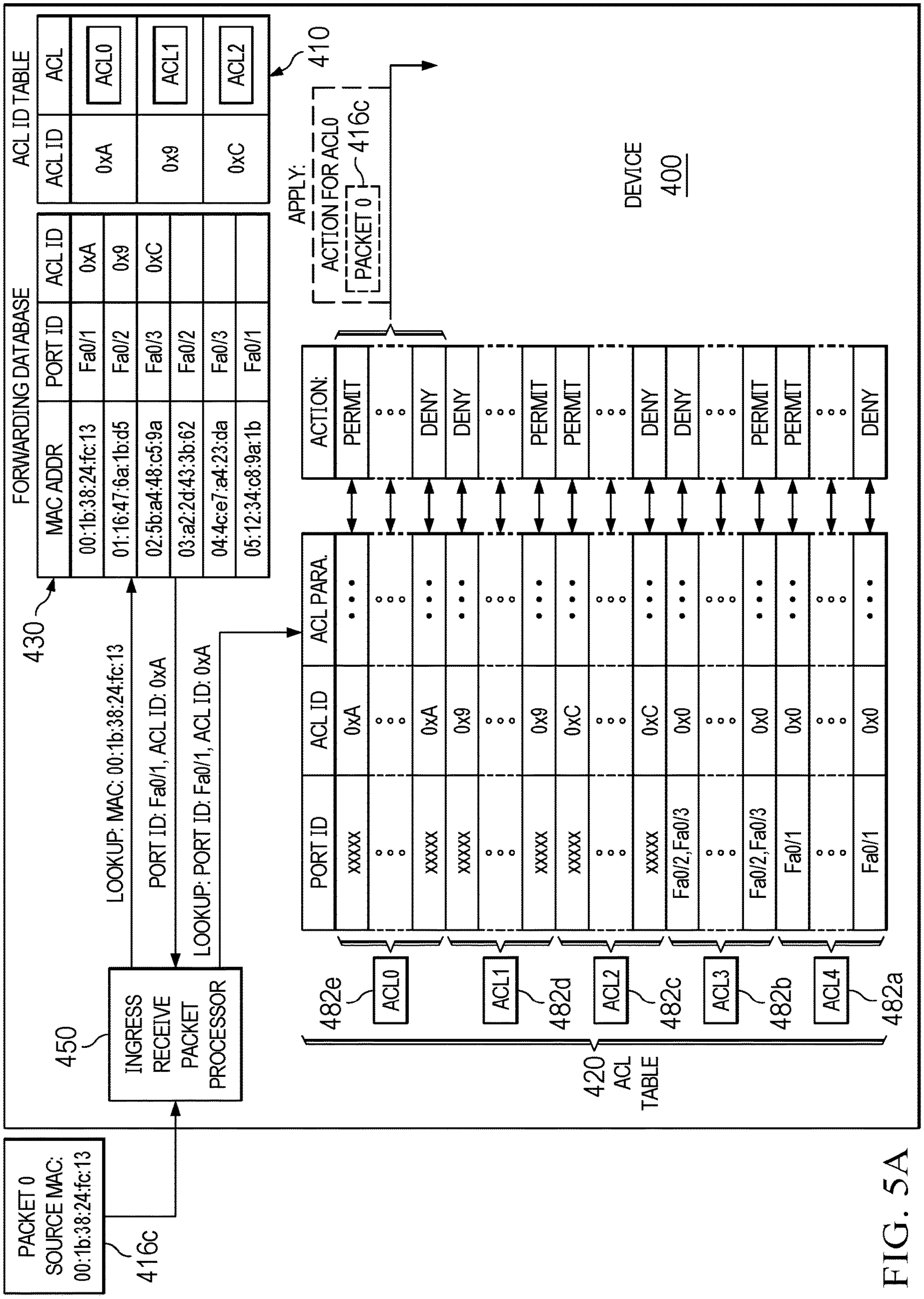
FIGS. 5A-5G are block diagrams depicting examples of the application of per-host ACLs by a network device in accordance with certain embodiments.

As can be seen with reference first to FIG. 5A, when network device 400 receives packet 416*c* ("packet 0"), ingress receive packet processor 450 determines the MAC address from the packet 416*c* and performs a lookup in forwarding database 430 based on this MAC address. This lookup returns port identifier Fa0/1 and ACL identifier 0xA associated with that MAC address (00:1b:38:24:fc:13). Ingress receive packet processor 450 then performs a lookup in ACL table 420 based on port identifier Fa0/1 and ACL identifier 0xA. Here, as entries for "ACL0" 428*e* are programmed as "don't care" for a port identifier and to match on the ACL identifier 0xA, an entry of the ACL table 420 corresponding to "ACL0" 428*e* may match this lookup and be applied to packet 416*c*.

Figure 5B:
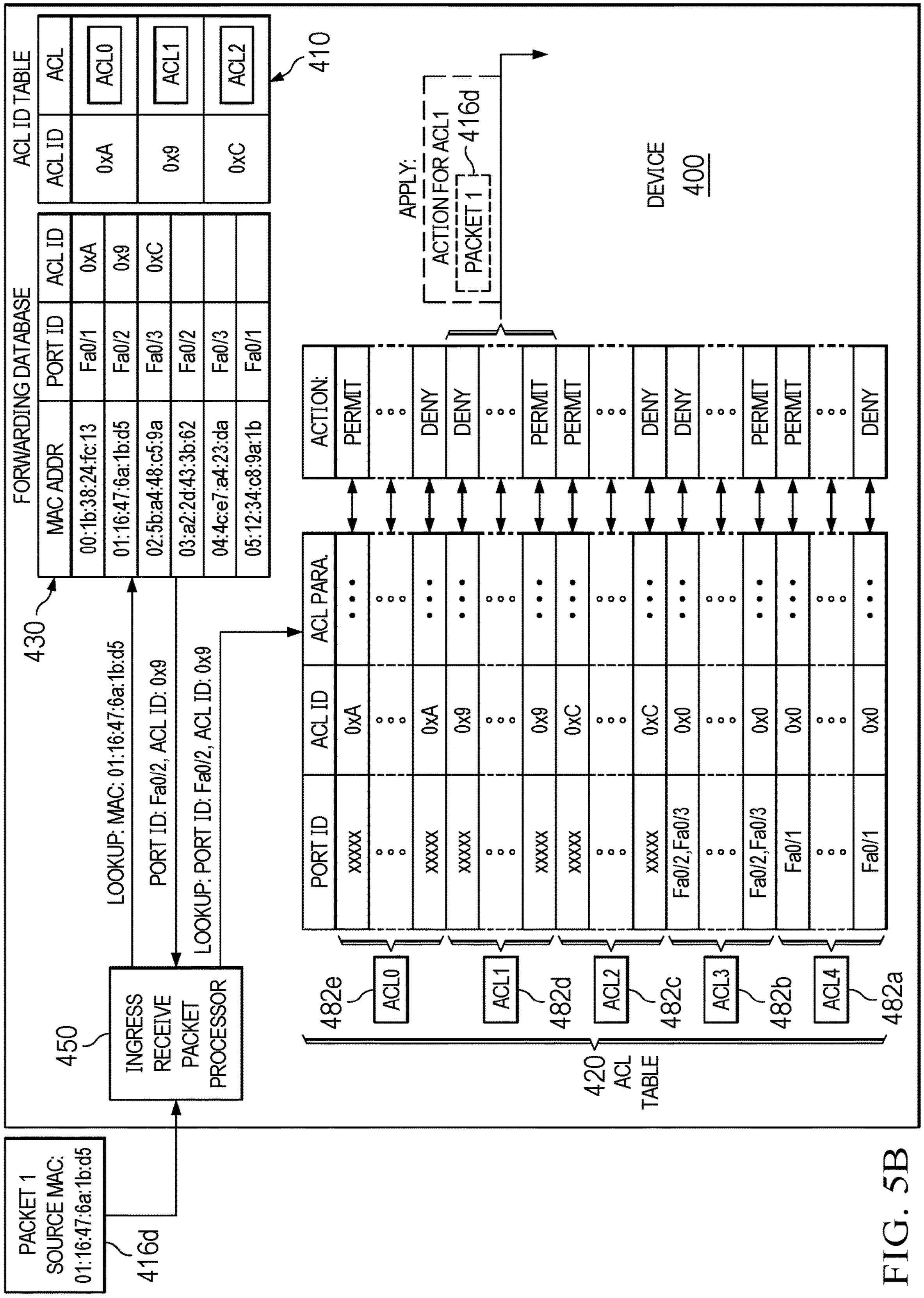

Similarly, in FIG. 5B, network device 400 receives packet 416*d* ("packet 1") and ingress receive packet processor 450 determines a MAC address 01:16:47:6a:1b:d5 from the packet 416*d* to perform a lookup in forwarding database 430 based on this MAC address 01:16:47:6a:1b:d5. This lookup returns port identifier Fa0/2 and ACL identifier 0x9. Ingress receive packet processor 450 performs a lookup in ACL table 420 based on port identifier Fa0/2 and ACL identifier 0x9. Entries for "ACL1" 428*d* are programmed as "don't care" for a port identifier and to match on the ACL identifier 0x9. Thus, an entry of the ACL table 420 corresponding to "ACL1" 428*d* may match this lookup and be applied to packet 416*d*.

Figure 5C:
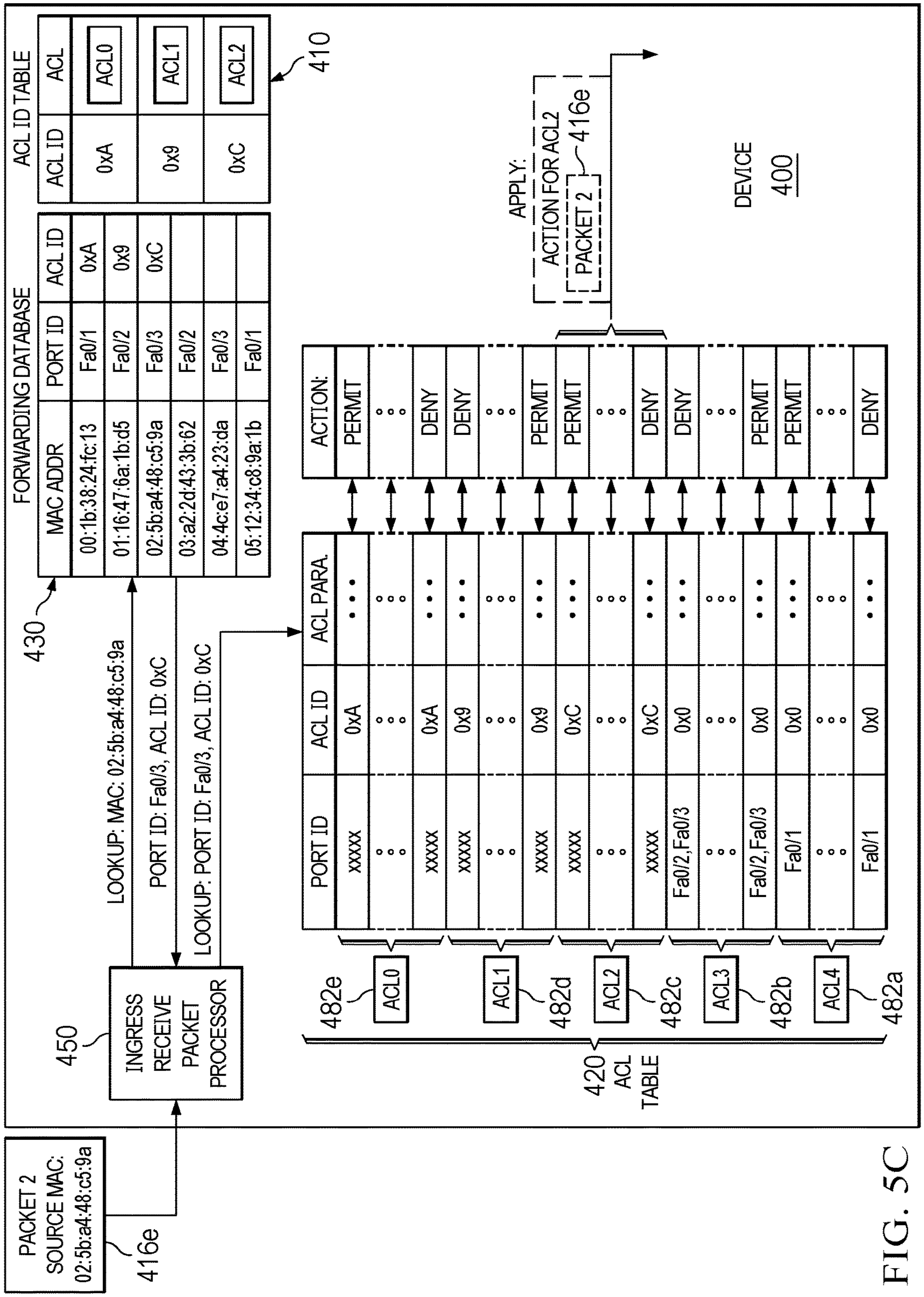

In FIG. 5C, packet 416*e* ("packet 2") is received at network device and MAC address 02:5b:a4:48:c5:9a is determined from the packet 416*e*. A lookup based on MAC 02:5b:a4:48:c5:9a is performed in forwarding database 430, returning port identifier Fa0/3 and ACL identifier 0xC. Ingress receive packet processor 450 performs a lookup in ACL table 420 based on port identifier Fa0/3 and ACL identifier 0xC. Entries for "ACL2" 428*c* are programmed as "don't care" for a port identifier and to match on the ACL identifier 0xC, resulting in an entry of the ACL table 420 corresponding to "ACL2" 428*c* matching this lookup and being applied to packet 416*e*.

Figure 5D:
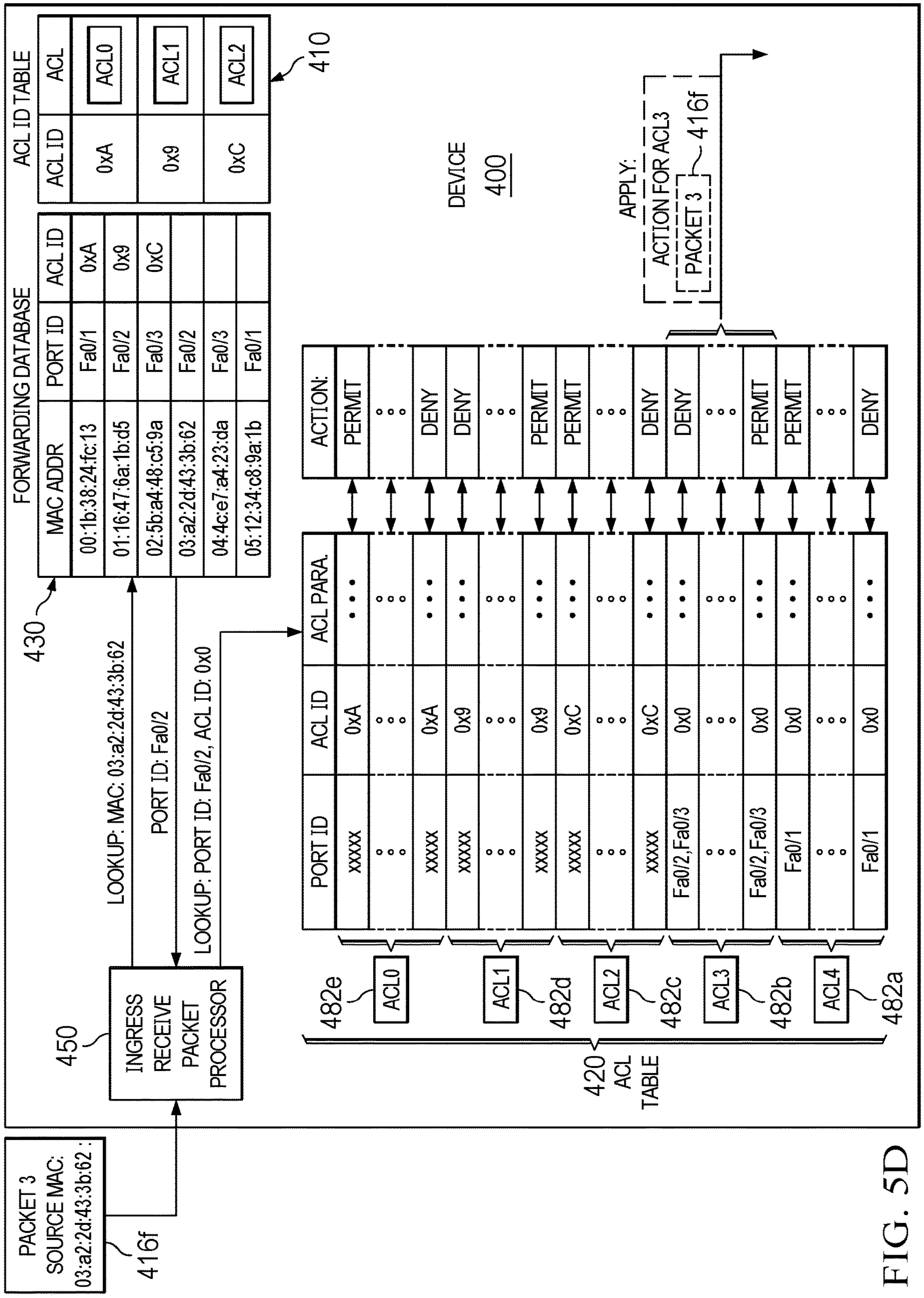
Figure 5E:
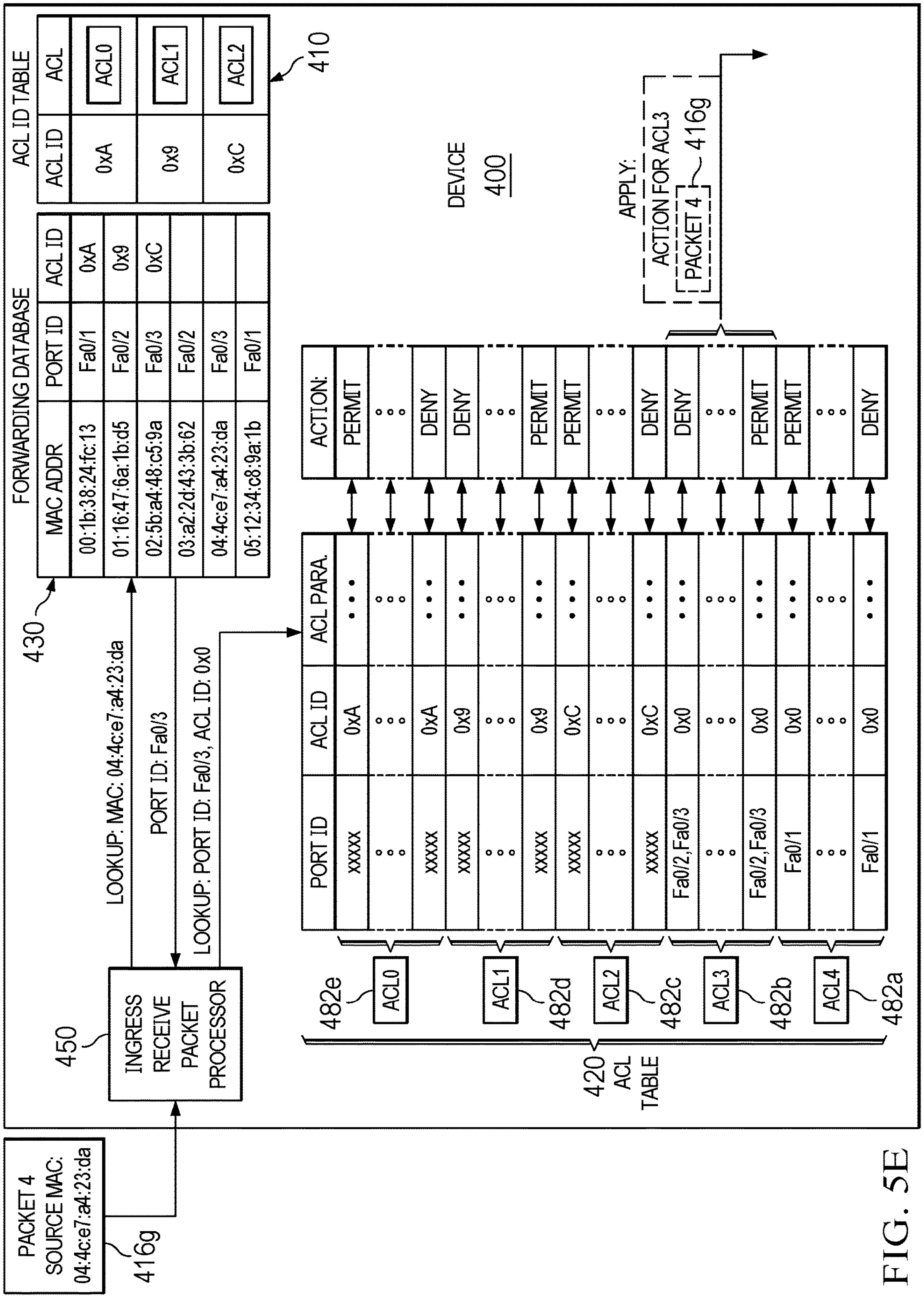
Figure 5F:
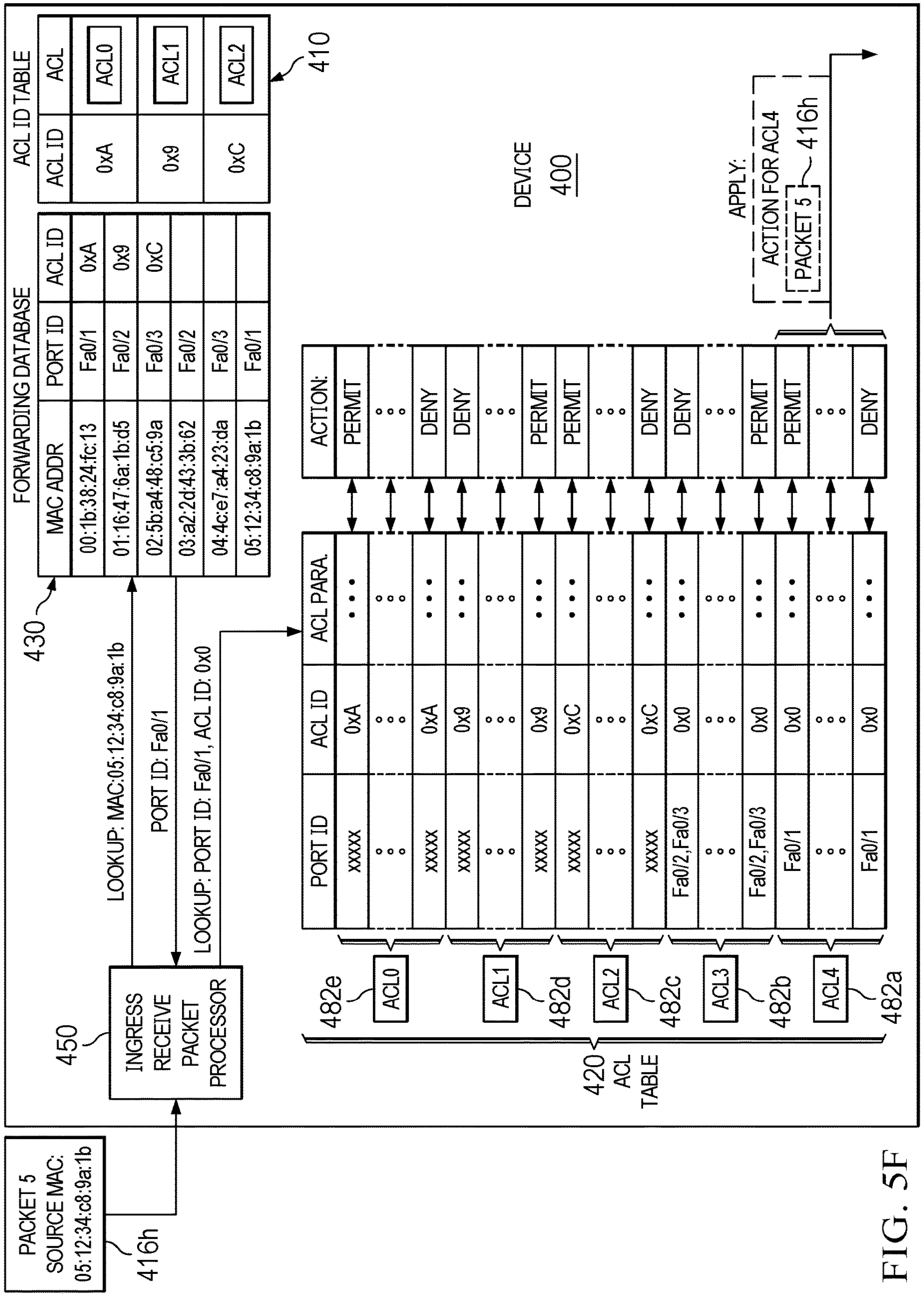

FIGS. 5D-5F depict examples of applying port based ACLs to hosts with no per-host ACL applied. In FIG. 5D, when a packet 416*f* ("packet 3") is received at network device 400, ingress receive packet processor 450 determines the MAC address 03:a2:2d:43:3b:62 from the packet 416*f* and performs a lookup in forwarding database 430 based on this MAC address. This lookup returns port identifier Fa0/2 associated with that MAC address, and no ACL identifier. Ingress receive packet processor 450 then performs a lookup in ACL table 420 based on port identifier Fa0/2 and the default ACL identifier 0x0. Here, as entries for "ACL3" 428*b* are programmed to match on port identifier Fa0/2 and the default ACL identifier 0x0, an entry of the ACL table 420 corresponding to "ACL3" 428*b* matches this lookup and is applied to packet 416*f*. Likewise, in FIG. 5E, packet 416*g* ("packet 4") is received at network device 400. Ingress receive packet processor 450 determines the MAC address 04:4c:e7:a4:23:da from the packet 416*f* and performs a lookup in forwarding database 430 based on this MAC address. Port identifier Fa0/3 associated with that MAC address and no ACL identifier is returned in response to this lookup. Ingress receive packet processor 450 then performs a lookup in ACL table 420 based on port identifier Fa0/3 and the default ACL identifier 0x0. As entries for "ACL3" 428*b* are programmed as to match on port identifier Fa0/3 and the default ACL identifier 0x0, an entry of the ACL table 420 corresponding to "ACL3" 428*b* also matches this lookup and is applied to packet 416*g*.

In FIG. 5F, packet 416*h* ("packet 5") is received at network device 400 and ingress receive packet processor 450 determines the MAC address 05:12:34:c8:9a: 1b from the packet 416*h*. Ingress receive packet processor 450 performs a lookup in forwarding database 430 and receives port identifier Fa0/1 (and no ACL identifier) in response to this lookup. A lookup in ACL table 420 is then made by ingress receive packet processor 450 based on the returned port identifier Fa0/1 and the default ACL identifier 0x0. As entries for "ACL4" 428*a* are programmed to match on port identifier Fa0/1 and the default ACL identifier 0x0, an entry of the ACL table 420 corresponding to "ACL4" 428*a* matches this lookup and is applied to packet 416*h*.

Figure 5G:
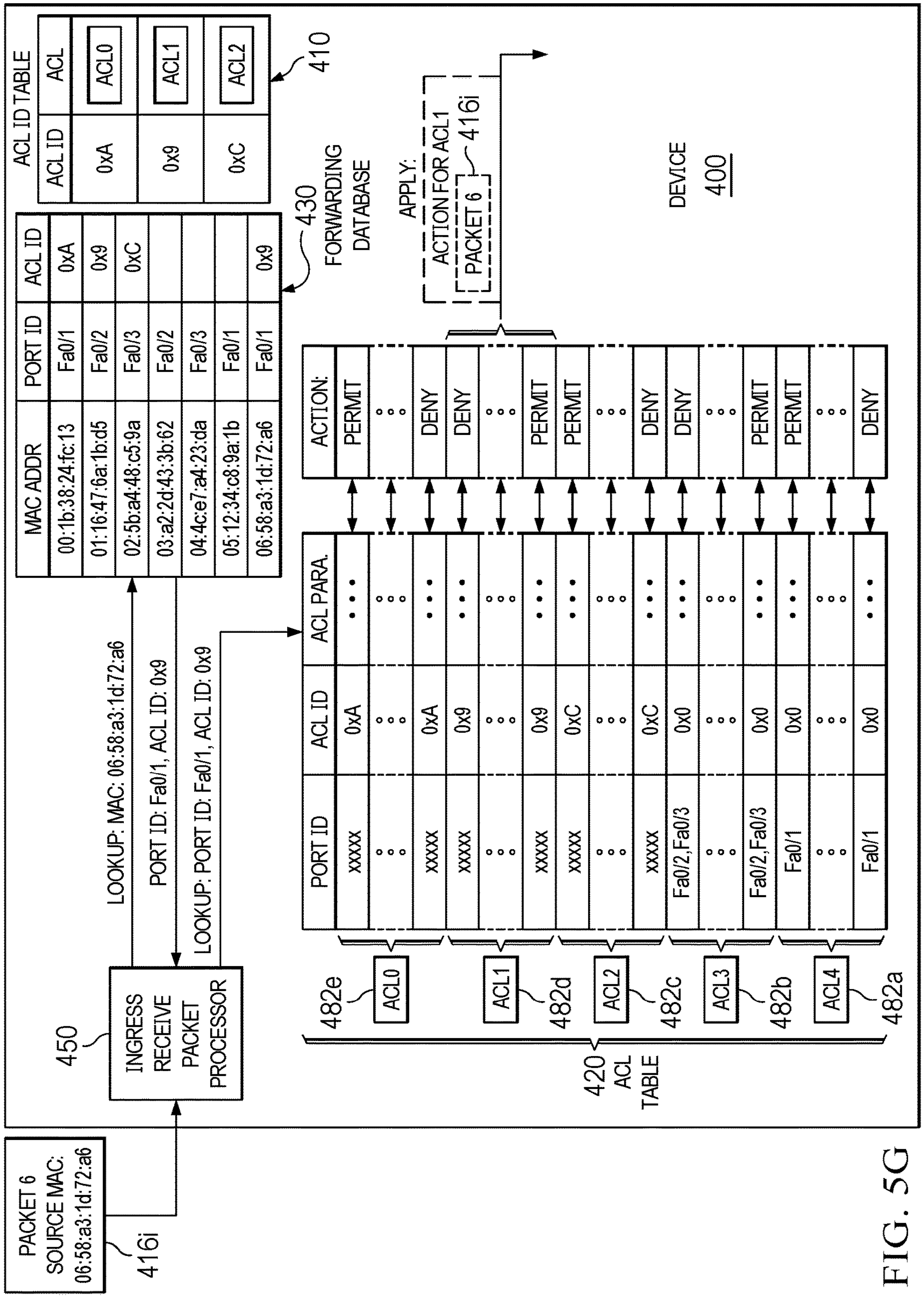

Moving now to FIG. 5G, now assume for purposes of this example that at some point "ACL1" 482*d* has been applied to a host on port Fa0/1 having MAC address 06:58:a3:1d:72:a6, and an entry associating this MAC addresses with the ACL identifier 0x9 for "ACL1" 428*d* is included in forwarding database 430. Now, when packet 416*i* ("packet 6") is received at network device 400, ingress receive packet processor 450 determines the MAC address 06:58:a3:1d:72:

a6 from the packet 416*i* and performs a lookup in forwarding database 430 based on the MAC address 06:58:a3:1d:72:a6. This lookup returns port identifier Fa0/1 and ACL identifier 0x9 associated with that MAC address. Ingress receive packet processor 450 then performs a lookup in ACL table 420 based on port identifier Fa0/1 and ACL identifier 0x9. Entries for "ACL1" 428*d* are programmed as "don't care" for a port identifier and to match on the ACL identifier 0x9. Thus, an entry of the ACL table 420 corresponding to "ACL1" 428*d* may match this lookup and be applied to packet 416*i*. Notice with respect to these examples then, that a same per-host ACL (e.g., "ACL1" 428*d* assigned identifier 0x9) may be applied to two different hosts (having MAC addresses 01:16:47:6a:1b:d5, 06:58:a3:1d:72:a6) residing on two different ports (Fa0/2, Fa0/1) using only a single copy of that ACL stored in ACL table 420, while two different hosts (having MAC addresses 00:1b:38:24:fc:13, 06:58:a3:1d:72:a6) residing on the same port may have different per-host ACLs applied (e.g., "ACL0" 428*e* assigned identifier 0xA and "ACL1" 428*d* assigned identifier 0x9).

Figure 6:
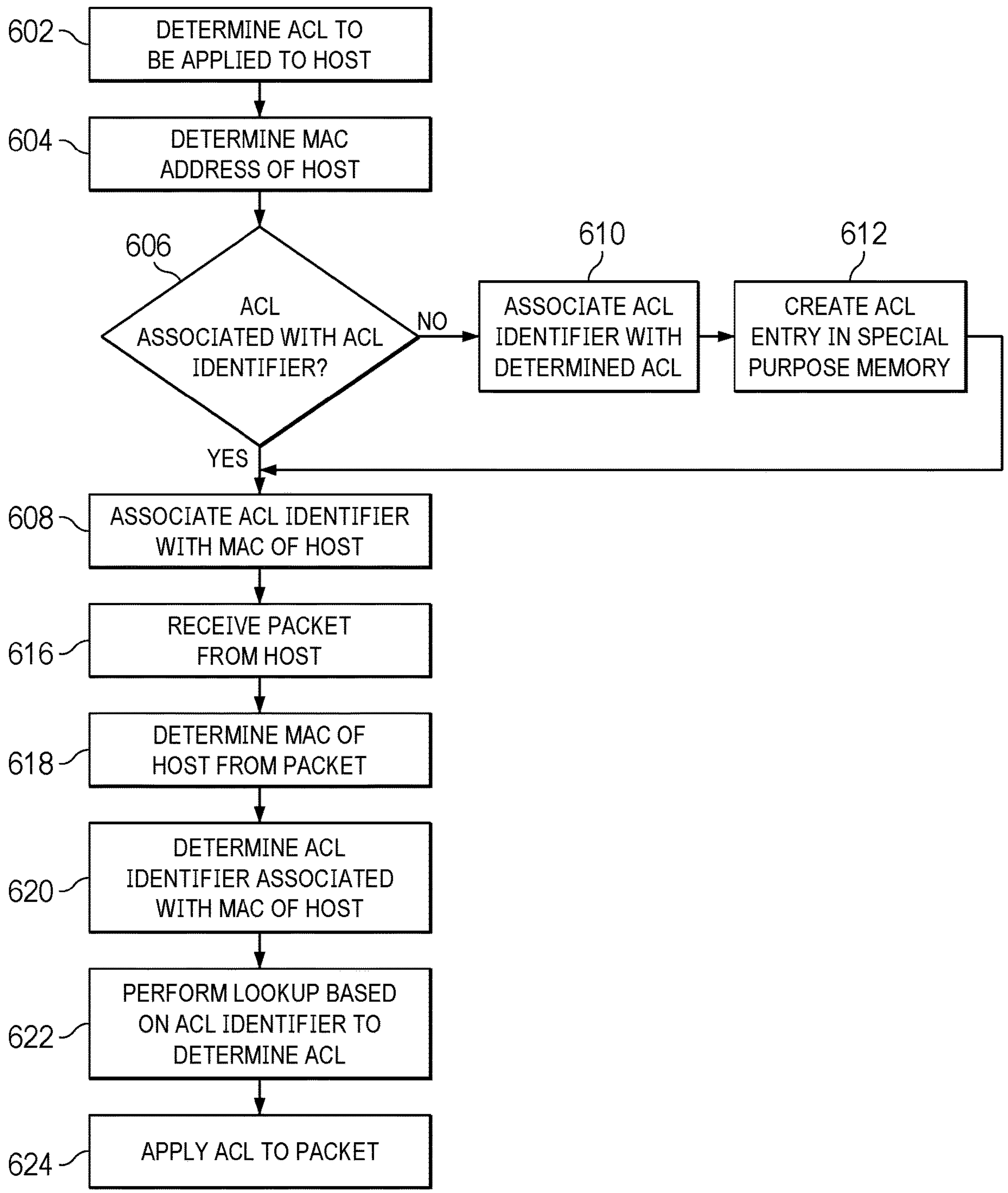
FIG. 6 is a flow diagram for an embodiment of a method for applying an ACL to a host.
Figure 7:
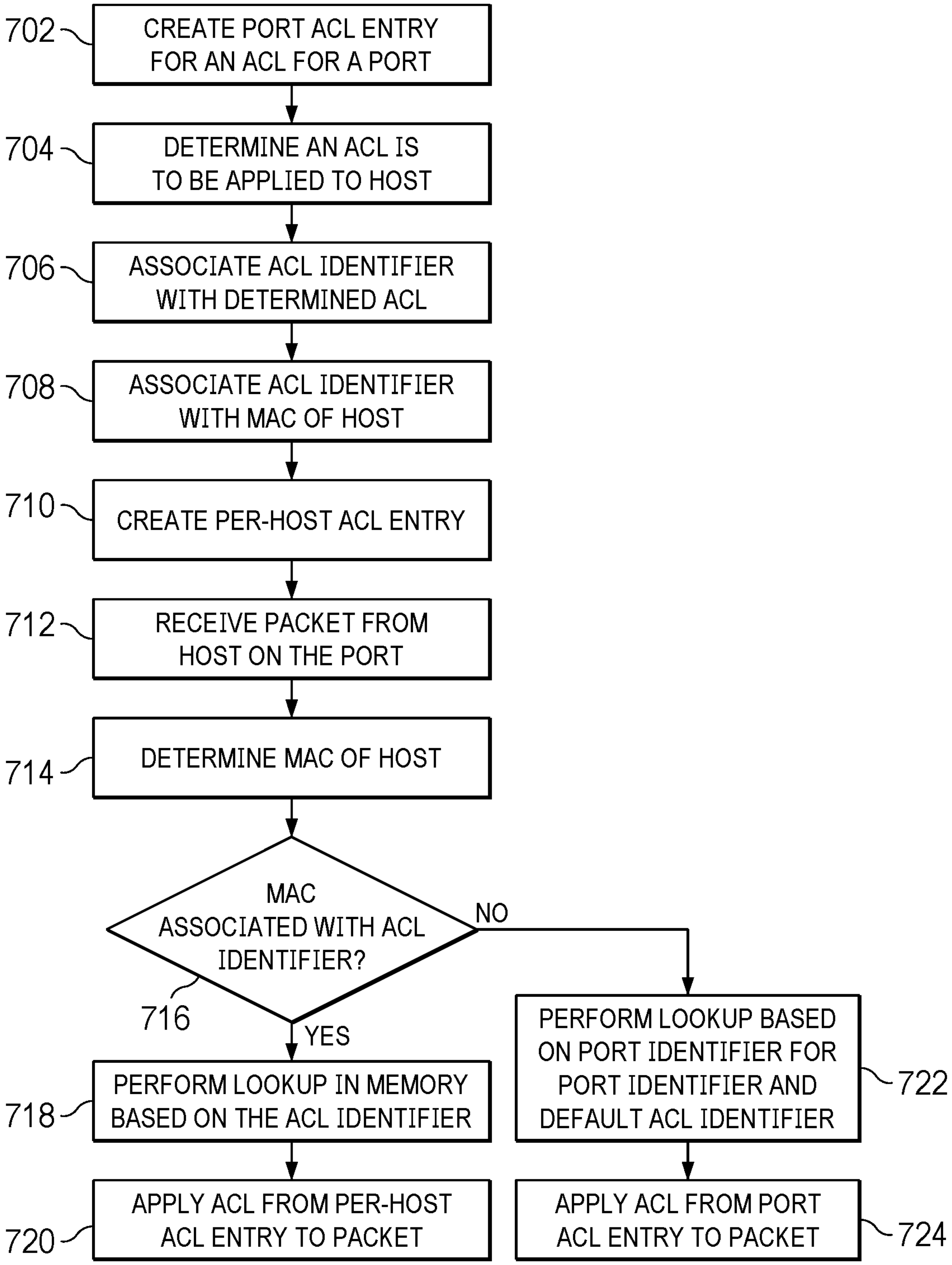
FIG. 7 is a flow diagram for an embodiment of a method for applying per-host ACLs in association with port based ACLs.
Figure 8:
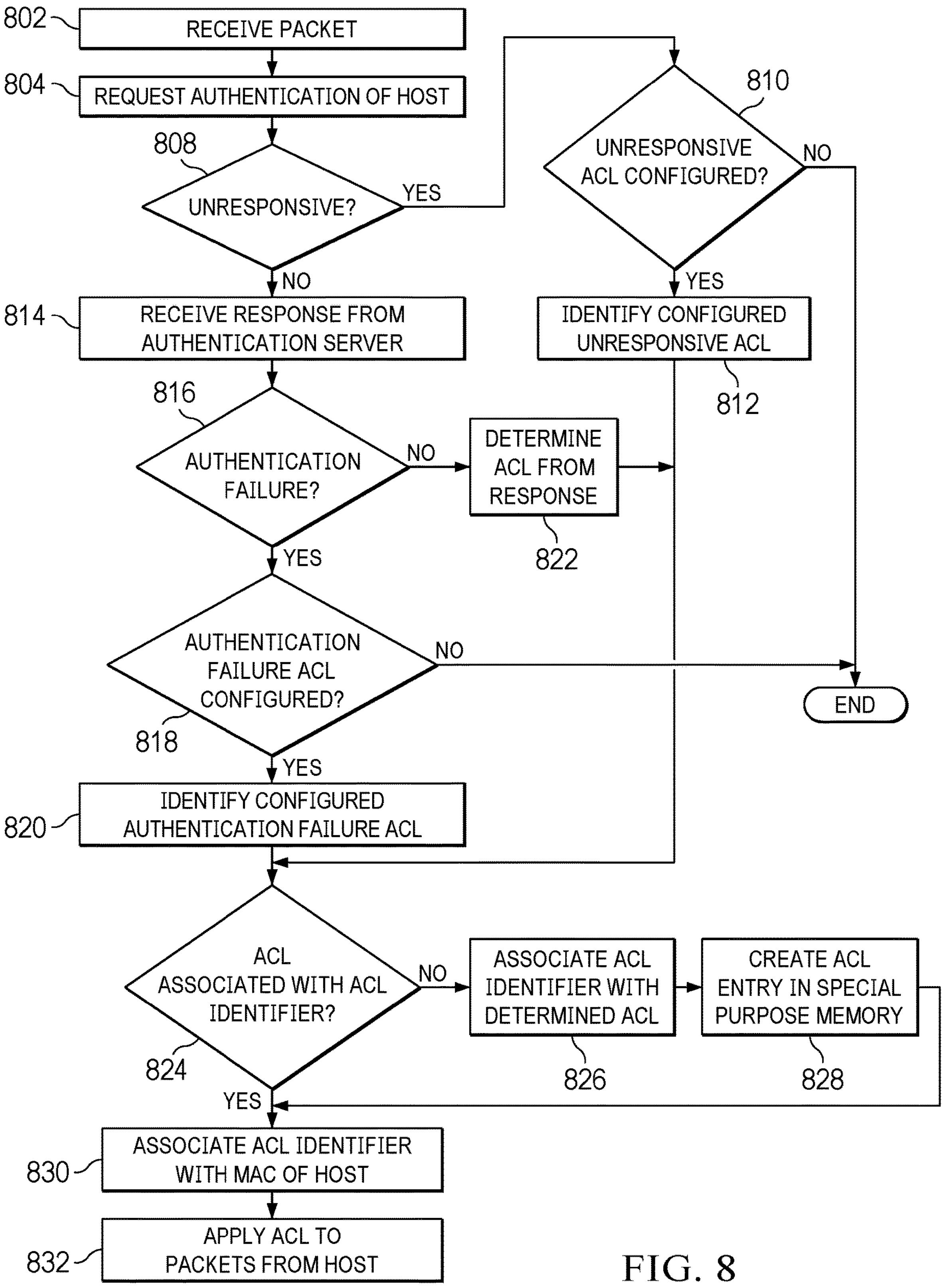
FIG. 8 is a flow diagram for an embodiment of a method for applying per-host ACLs in a network device acting as an authenticator in a network environment.

Turning to FIGS. 6-8, flow diagrams for embodiments of methods that may be implemented by a network device when providing per-host ACLs are disclosed. Initially looking at FIG. 6, a flow diagram for one embodiment of a method for applying an ACL to a host is depicted. At some point during operation of a network device it can be determined that an ACL is to be applied to a host on a per-host basis (STEP 602). This determination can be made in response to receiving a packet from that host, such as when an authentication is performed, or in some other manner. The MAC address of the host to which the ACL is to be applied is also determined (STEP 604), such as from an analysis of a packet received from the host.

A determination is made if the ACL to be applied to the host is associated with an ACL identifier (STEP 606). This determination can be made, for example, by accessing a table or other storage structure in memory storing an association between ACLs and assigned ACL identifiers for those ACLs. If an ACL identifier has been assigned to that ACL (Y branch of STEP 606) the ACL identifier of the ACL is associated with the MAC of the host to which it is being applied (STEP 608). This association may comprise storing the ACL identifier in an entry for that host in a forwarding database comprising the MAC address for that host.

If there is no ACL identifier assigned to the ACL to be applied (N branch of STEP 606) an ACL identifier is associated with that ACL (STEP 610). The associated ACL identifier may be assigned to the ACL by selecting an ACL identifier from a set of (e.g., unused) identifiers that may be used for ACLs, or may be another type of identifier. The ACL identifier assigned to the ACL is stored in association with the ACL (e.g., in the table or other storage structure in memory storing an association between ACLs and assigned ACL identifiers). Additionally, a copy of that ACL comprising one or more ACL entries is created in a special purpose memory such as TCAM, FPGA, or a hash table (STEP 612). The entries for this ACL are configured to match a lookup based on the assigned ACL identifier for that ACL and may also be configured as "don't care" for a port identifier parameter (e.g., may be configured to match on a lookup based on the assigned ACL identifier regardless of a value for a port identifier parameter, or if a value for a port identifier parameter is included in a lookup). The ACL identifier for the ACL is also associated with the MAC of the host to which it is being applied (STEP 608).

When a packet is received from a host at the network device (STEP 616), the MAC of the host can be determined from the packet (STEP 618). This MAC address is used to determine the ACL identifier associated with the MAC address of the host (STEP 620). For example, a lookup may be performed in a forwarding database based on the MAC address to determine the ACL identifier associated with the MAC address of the host from the association between the MAC address and the ACL identifier in the entry for that MAC address in the forwarding database. A lookup based on that ACL identifier is performed in the special purpose memory to determine an entry of that ACL to apply to the packet received from the host (STEP 622) and that entry is applied to the packet (STEP 624).

FIG. 7 depicts a flow diagram for one embodiment of a method for applying per-host ACLs in association with port based ACLs on a network device. When a port based ACL is applied to a network interface at a network device, one or more port ACL entries may be created for that port ACL in a special purpose memory at the network device (STEP 702). Specifically, according to embodiments, entries for these port based ACLs may be programmed to match based on an identifier for the port to which that ACL applies, and a default ACL identifier (e.g., zero or another value).

Per-host ACLs can also be applied to hosts at the network device. As discussed, when it is determined that a per-host ACL is to be (e.g., initially) applied to a host (STEP 704) an ACL identifier is associated with that ACL (STEP 706) and The ACL identifier for the ACL is also associated with the MAC of the host to which it is being applied (STEP 708), such as in entry in a forwarding database comprising the MAC address for that host. A copy of that per-host ACL comprising one or more per-host ACL entries is created in the special purpose memory (STEP 710) where these per-host ACL entries are configured to match a lookup based on the assigned ACL identifier for that per-host ACL and as "don't care" for a port identifier parameter.

When a packet is received from a host at the network device (STEP 712), the MAC of the host can be determined from the packet (STEP 714). This MAC address is used to determine if an ACL identifier is associated with the MAC address of the host (STEP 716). For example, a lookup may be performed in a forwarding database based on the MAC address to determine a port identifier for a port associated with the MAC address of the host from which the packet was received and any ACL identifier associated with that MAC address in the entry for that MAC address in the forwarding database.

If no ACL identifier is associated with the MAC (N branch of STEP 716) (e.g., the lookup of in the forwarding table based on the MAC address did not return an ACL identifier), a lookup is performed in the special purpose memory based on the port identifier associated with the host and the default ACL identifier value (e.g., STEP 722). If a port based ACL for the identified port has been programmed in the special purpose memory, a port ACL entry in the special purpose memory associated with that port based ACL may match such a lookup and be applied to the packet (STEP 724).

If, however, an ACL identifier is associated with the MAC (Y branch of STEP 716) (e.g., the lookup of in the forwarding table based on the MAC address did return an ACL identifier), a lookup is performed in the special purpose memory based on the returned ACL identifier (e.g., STEP 718). A per-host ACL entry associated with the per-host ACL corresponding to that ACL identifier may match such a lookup, and be applied to the packet (STEP 720).

Referring now to FIG. 8, a flow diagram for one embodiment of a method for applying per-host ACLs on a network device acting as an authenticator is depicted. When a packet is received from a (e.g., unauthenticated) host at the network device (STEP 802), an authentication of this host can be requested (STEP 804). In particular, a network device can serve as an authenticator in a network environment to authenticate hosts coupled to the network device using an authentication server (such as a RADIUS server or the like), and can control network traffic between the hosts and the network based on the result of the authentication. Accordingly, when a host is to be authenticated an authentication request (e.g., an authentication or access request, a challenge request, etc.) requesting authentication of the host can be sent to such an authentication server.

If the authentication server is unresponsive (Y branch STEP 808), such as when no response is received from the authentication server after the expiration of a certain time period or after a certain number of requests for authentication are sent, it can be determined if an unresponsive ACL has been configured (STEP 810). For example, an authentication unresponsive ACL configuration may be configured at the network device, where this authentication unresponsive ACL configuration specifies an authentication unresponsive ACL to apply to a host when the authentication server does not respond to an authentication request.

If no authentication unresponsive ACL has been configured (N branch of STEP 810) no further action may be taken. However, if an authentication unresponsive ACL is configured (Y branch of STEP 810) the identity of the configured authentication unresponsive ACL is determined (STEP 812). A determination is made if this authentication unresponsive ACL to be applied to the host is associated with an ACL identifier (STEP 824). This determination can be made, for example, by accessing a table or other storage structure in memory storing an association between ACLs and assigned ACL identifiers for those ACLs. If an ACL identifier has been assigned to the authentication unresponsive ACL (Y branch of STEP 824) the ACL identifier of the authentication unresponsive ACL is associated with the MAC of the host (STEP 830). This association may comprise storing the ACL identifier in an entry for that host in a forwarding database comprising the MAC address for that host. This authentication unresponsive ACL can then be applied to packets from the host (STEP 832).

If there is no ACL identifier assigned to the authentication unresponsive ACL to be applied (N branch of STEP 824) an ACL identifier is associated with the authentication unresponsive ACL (STEP 826). The ACL identifier assigned to the authentication unresponsive ACL is stored in association with that ACL (e.g., in the table or other storage structure in memory storing an association between ACLs and assigned ACL identifiers). Additionally, a copy of that authentication unresponsive ACL comprising one or more ACL entries is created in a special purpose memory (STEP 828). The entries for this authentication unresponsive ACL are configured to match a lookup based on the assigned ACL identifier for that authentication unresponsive ACL and is configured as "don't care" for a port identifier parameter (e.g., is configured to match on a lookup based on the assigned ACL identifier regardless of any value for a port identifier parameter included in a lookup). The ACL identifier for the authentication unresponsive ACL is also associated with the MAC of the host to which it is being applied (STEP 830) so the authentication unresponsive ACL can then be applied to packets from the host (STEP 832).

If a response is received from the authentication server (N branch of STEP 808 and STEP 814) it can then be determined if authentication of that host failed (STEP 816) based on the response from the authentication server. If the authentication of the (e.g., user at the) host failed (Y branch of STEP 816) it can be determined if an authentication failure ACL has been configured (STEP 818). For example, an authentication failure ACL configuration may be configured at the network device, where this authentication failure ACL configuration specifies an authentication failure ACL to apply to a host when the authentication of the host fails.

If no authentication failure ACL has been configured (N branch of STEP 818) no further action may be taken. However, if an authentication failure ACL is configured (Y branch of STEP 818) the identity of the configured authentication failure ACL is determined (STEP 820). A determination is then made if this authentication failure ACL to be applied to the host is associated with an ACL identifier (STEP 824). If an ACL identifier has been assigned to the authentication failure ACL (Y branch of STEP 824) the ACL identifier of the authentication failure ACL is associated with the MAC of the host (STEP 830). The authentication failure ACL can then be applied to packets from the host (STEP 832).

If there is no ACL identifier assigned to the authentication failure ACL to be applied (N branch of STEP 824) an ACL identifier is associated with the authentication failure ACL (STEP 826). The ACL identifier assigned to the authentication failure ACL is stored in association with that authentication failure ACL. A copy of that authentication failure ACL comprising one or more ACL entries is created in the special purpose memory (STEP 828). The entries for this authentication failure ACL are configured to match a lookup based on the assigned ACL identifier for that authentication failure ACL and may also be configured as "don't care" for a port identifier parameter. The ACL identifier for the authentication failure ACL is also associated with the MAC of the host to which it is being applied (STEP 830) so the authentication unresponsive ACL can be applied to packets from the host (STEP 832).

If the authentication of the host succeeded (e.g., an access-accept response was received) (N branch of STEP 816), the authentication server may return an ACL to apply to the authenticated host in the response to the authentication request for the host from the network device. This ACL can be identified, for example, using an ACL name for the ACL, or a set of ACL filter rules for the ACL. The ACL in the authentication response can thus be determined from the authentication response at the network device (STEP 822). Again, a determination can be made if the ACL to be applied to the host identified in the authentication response is associated with an ACL identifier (STEP 824). If an ACL identifier has been assigned to this ACL (Y branch of STEP 824) the ACL identifier of the ACL is associated with the MAC of the host (STEP 830). The ACL can then be applied to packets from the host (STEP 832).

If there is no ACL identifier assigned to the ACL to be applied (N branch of STEP 824) an ACL identifier is associated with the ACL (STEP 826). The ACL identifier assigned to the ACL is stored in association with that ACL. A copy of that ACL comprising one or more ACL entries is created in the special purpose memory (STEP 828). The entries for this ACL are configured to match a lookup based on the assigned ACL identifier for that ACL and may also be configured as "don't care" for a port identifier parameter. The ACL identifier for the ACL is also associated with the MAC of the host to which it is being applied (STEP 830) so that ACL can be applied to packets from the host on a per-host basis (STEP 832). In this manner, ACLs can be applied on a per-host basis in an authenticated network environment, even in cases where an authentication server is unresponsive or authentication of a host fails. Moreover, application of such ACLs in this type of authenticated environment provides the same advantages provided by embodiments employed in other settings, including preventing the drop or delay of traffic when applying an ACL to multiple hosts, the ability to efficiently apply the same ACL across a large number of hosts, rapid transitions from a port ACL to a per-host ACL and the application of a port based ACL to a host when no per-host ACL has been applied.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method, comprising:

determining for a host a corresponding access-control list (ACL) to be applied to packets received from the host, wherein the packets are received at a network device;

associating with the ACL a corresponding ACL identifier;

determining for the host a corresponding media access control (MAC) address;

associating the first MAC address with the ACL identifier in a first memory;

creating an ACL entry in a ternary content addressable memory (TCAM), wherein the ACL entry comprises the ACL and the corresponding ACL identifier;

receiving a first packet at the network device;

determining from the first packet the MAC address of a first the host from which the first packet was received;

determining, from the first memory, the ACL identifier associated with the MAC address;

performing a lookup in the TCAM based on the ACL identifier to determine a first the ACL from the corresponding ACL entry in the TCAM; and controlling a flow of the received first packet according to an action specified by the ACL.

2. The method of claim 1, wherein associating the ACL identifier with the MAC address of the host in the first memory comprises creating an entry for the MAC address in a forwarding database in the first memory at the network device, and determining the ACL identifier comprises performing a lookup in the forwarding database based on the MAC address.

3. The method of claim 2, wherein the ACL identifier is an ACL Class Identifier.

4. The method of claim 1, further comprising:

determining the ACL is to be applied to packets received from a second host, wherein the packets are received at the network device;

determining that the ACL identifier is associated with the determined ACL;

associating the ACL identifier with a MAC address of the second host in the first memory;

receiving a second packet from the second host at the network device;

determining the MAC address of the second host from the second packet received from the second host;

determining the ACL identifier from the association in the first memory between the ACL identifier and the determined MAC address of the second host;

performing a lookup in the TCAM based on the ACL identifier to determine the ACL from the ACL entry in the TCAM; and applying the ACL to the second packet received from the second host to control the second packet received from the second host according to the action specified by the ACL when the second packet received from the second host matches the ACL, and controlling the second packet without applying the ACL when the second packet received from the second host does not match the ACL.

5. The method of claim 4, wherein the first host and the second host are coupled to different interfaces of the network device.

6. A method, comprising:

creating a port access-control list (ACL) entry in a ternary content addressable memory (TCAM) at a network device, wherein the port ACL entry comprises a first ACL and a port identifier for a port of the network device;

determining a second ACL to be applied to packets received from a host at the network device;

associating an ACL identifier with the determined second ACL;

associating the ACL identifier with a media access control (MAC) address of the host in a first memory at the network device;

creating a per-host ACL entry in the TCAM at the network device, wherein the per-host ACL entry comprises the second ACL and the ACL identifier;

receiving a packet from the host on the port of the network device;

determining from the received packet the MAC address of the host from which the received packet was received;

when the determined MAC address is not associated with the ACL identifier in the first memory:

performing a lookup in the TCAM based on the port identifier of the port on which the packet was received and a default ACL identifier value, thereby identifying the first ACL from the port ACL entry; and controlling a flow of the received packet according to a first action specified by the first ACL when the received packet matches the first ACL; and when the determined MAC address is associated with the ACL identifier associated with the second ACL in the first memory:

performing a lookup in the TCAM based on the ACL identifier associated with the second ACL, thereby identifying the second ACL from the per-host ACL entry;

controlling the flow of the received packet according to a second action specified by the second ACL when the received packet matches the second ACL; and controlling the flow of the second packet without applying the ACL when the second packet received from the second host does not match the ACL.

7. The method of claim 6, wherein the default ACL identifier value is zero.

8. The method of claim 6, wherein:

creating the per-host ACL entry comprises programming the TCAM with the per-host ACL entry to match on the ACL identifier associated with the second ACL; and creating the port ACL entry comprises programming the TCAM with the port ACL entry to match on the port identifier and the default ACL identifier value.

9. The method of claim 8, wherein the TCAM is programmed as "don't care" for a port identifier parameter of the per-host ACL entry.

10. The method of claim 9, wherein the ACL identifier associated with the second ACL is associated with the MAC address of each of the one or more hosts and the port identifier in a forwarding database in the first memory.

* * * * *